US011076148B2

United States Patent
Sakakibara

(10) Patent No.: US 11,076,148 B2
(45) Date of Patent: Jul. 27, 2021

(54) SOLID-STATE IMAGE SENSOR, IMAGING APPARATUS, AND METHOD FOR CONTROLLING SOLID-STATE IMAGE SENSOR

(71) Applicant: SONY SEMICONDUCTOR SOLUTIONS CORPORATION, Kanagawa (JP)

(72) Inventor: Masaki Sakakibara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/962,465

(22) PCT Filed: Apr. 15, 2019

(86) PCT No.: PCT/JP2019/016119
§ 371 (c)(1),
(2) Date: Jul. 15, 2020

(87) PCT Pub. No.: WO2019/230217
PCT Pub. Date: Dec. 5, 2019

(65) Prior Publication Data
US 2021/0084288 A1    Mar. 18, 2021

(30) Foreign Application Priority Data

Jun. 1, 2018 (JP) .............................. JP2018-105731

(51) Int. Cl.
*H04N 17/00* (2006.01)
*H04N 5/369* (2011.01)

(52) U.S. Cl.
CPC ........... *H04N 17/002* (2013.01); *H04N 5/369* (2013.01)

(58) Field of Classification Search
CPC .............................. H04N 17/002; H04N 5/369
See application file for complete search history.

(56) References Cited

U.S. PATENT DOCUMENTS 6,115,305 A    9/2000 Pathak et al.
6,253,161 B1   6/2001 Arias-Estrada
(Continued)

FOREIGN PATENT DOCUMENTS

CA    2242622 A1    1/1999
CA    2365956 A1    12/2000
(Continued)

OTHER PUBLICATIONS

International Search Report and Written Opinion of PCT Application No. PCT/JP2019/016119, dated Jul. 2, 2019, 08 pages of ISRWO.

(Continued)

*Primary Examiner* — Michael E Teitelbaum
(74) *Attorney, Agent, or Firm* — Chip Law Group

(57) ABSTRACT

In a solid-state image sensor in which an arbiter arbitrates a request, a failure point is identified. A plurality of pixels generates a request for requesting transmission of a predetermined detection signal, in a case where a predetermined event is detected. A test circuit outputs the request of each of the plurality of pixels as an output request in a case where a test is not instructed, and generates a plurality of new requests and outputs each as the output request in a case where the test is instructed. The arbiter arbitrates the output request. A communication circuit transmits the detection signal on the basis of an arbitration result of the arbiter. A failure determination unit determines whether or not the arbiter has a failure on the basis of the detection signal in a case where the test is instructed.

8 Claims, 33 Drawing Sheets

(56) References Cited

U.S. PATENT DOCUMENTS

| | | | |
|---|---|---|---|
| 2009/0066793 A1 | 3/2009 | Takeda | |
| 2009/0237103 A1* | 9/2009 | Ellis-Monaghan | H01L 22/34 324/750.3 |
| 2010/0177585 A1* | 7/2010 | Rubinstein | G11C 19/00 365/230.05 |
| 2015/0293173 A1 | 10/2015 | Tsuboi et al. | |
| 2016/0227135 A1 | 8/2016 | Matolin et al. | |
| 2017/0059399 A1* | 3/2017 | Suh | H04N 5/3745 |

FOREIGN PATENT DOCUMENTS

| | | |
|---|---|---|
| CA | 2923701 A1 | 3/2015 |
| CN | 1355889 A | 6/2002 |
| CN | 104977523 A | 10/2015 |
| CN | 105706439 A | 6/2016 |
| CN | 106488151 A | 3/2017 |
| EP | 1192475 A2 | 4/2002 |
| EP | 1881699 A1 | 1/2008 |
| EP | 2930524 A1 | 10/2015 |
| EP | 3139595 A1 | 3/2017 |
| JP | 2003-502787 A | 1/2003 |
| JP | 4818112 B2 | 11/2011 |
| JP | 2015-206785 A | 11/2015 |
| JP | 2016-533140 A | 10/2016 |
| JP | 2017-050853 A | 3/2017 |
| KR | 10-2002-0013525 A | 2/2002 |
| KR | 10-2015-0118035 A | 10/2015 |
| KR | 10-2016-0071386 A | 6/2016 |
| KR | 10-2017-0027107 A | 3/2017 |
| MY | 136005 A | 7/2008 |
| TW | 490676 B | 6/2002 |
| WO | 2000/077529 A2 | 12/2000 |
| WO | 2006/120815 A1 | 11/2006 |
| WO | 2015/036592 A1 | 3/2015 |

OTHER PUBLICATIONS

Posch, et al, "Retinomorphic Event-Based Vision Sensors: Bioinspired Cameras With Spiking Output", Proceedings of the IEEE, IEEE, vol. 102, No. 10, XP011559302, Oct. 1, 2014, pp. 1470-1484.
Extended European Search Report of EP Application No. 19811146.0, dated Apr. 15, 2021, 6 pages.

\* cited by examiner

FIG. 8

| T-ReqYp (CONTROL SIGNAL) | ReqYp1 (INPUT) | ReqYq1 (OUTPUT) |
|---|---|---|
| L | L (WITH REQUEST) | L (THROUGH OUTPUT) |
| L | H (WITHOUT REQUEST) | H (THROUGH OUTPUT) |
| H | L | L (FORCIBLY L OUTPUT) |
| H | H | L (FORCIBLY L OUTPUT) |

FIG. 19

| T-ReqYp (CONTROL SIGNAL) | ReqYp1 (INPUT) | ReqYq1 (OUTPUT) |
|---|---|---|
| L | L (WITH REQUEST) | L (FORCIBLY L OUTPUT) |
| L | H (WITHOUT REQUEST) | L (FORCIBLY L OUTPUT) |
| H | L | L (THROUGH OUTPUT) |
| H | H | H (THROUGH OUTPUT) |

FIG. 27

| Y-Ctrl (ROW ADDRESS AND MODE) || T-ReqY | EN |
| ROW ADDRESS | MODE | | |
| --- | --- | --- | --- |
| MATCHING ROW ADDRESS CORRESPONDING TO DECODER | 0 (NORMAL MODE) | L | L |
| MISMATCHING | 0 (NORMAL MODE) | L | L |
| MATCHING ROW ADDRESS CORRESPONDING TO DECODER | 1 (TEST MODE) | H (FORCIBLY L OUTPUT) | L |
| MISMATCHING | 1 (TEST MODE) | L | H (FORCIBLY H OUTPUT) |

SOLID-STATE IMAGE SENSOR, IMAGING APPARATUS, AND METHOD FOR CONTROLLING SOLID-STATE IMAGE SENSOR

CROSS REFERENCE TO RELATED APPLICATIONS

This application is a U.S. National Phase of International Patent Application No. PCT/JP2019/016119 filed on Apr. 15, 2019, which claims priority benefit of Japanese Patent Application No. JP 2018-105731 filed in the Japan Patent Office on Jun. 1, 2018. Each of the above-referenced applications is hereby incorporated herein by reference in its entirety.

TECHNICAL FIELD

The present technology relates to a solid-state image sensor, an imaging apparatus, and a method for controlling the solid-state image sensor. More specifically, the present technology relates to a solid-state image sensor for detecting that a change amount in luminance exceeds a threshold value as an address event, an imaging apparatus, and a method for controlling the solid-state image sensor.

BACKGROUND ART

Conventionally, in imaging apparatuses and the like, there have been used synchronous solid-state image sensors that capture image data (frame) in synchronization with a synchronization signal such as a vertical synchronization signal. In this general synchronous solid-state image sensor, image data can be acquired only every cycle (for example, 1/60 seconds) of the synchronization signal. Therefore, it is difficult to cope with a case where higher-speed processing is required in fields related to automatic driving, user interface of wearable device, and the like. Therefore, there has been proposed an asynchronous solid-state image sensor provided with a plurality of pixels that transmits a request by detecting in real time that a change amount in luminance exceeds a threshold value as an address event, and an arbiter that arbitrates those requests (for example, see Patent Document 1). Examples of a method for testing an operation of such a solid-state image sensor include, for example, a test method of placing a modulation light source that emits pulse light and analyzes a detection result at the time of emission of the pulse light.

CITATION LIST

Patent Document

Patent Document 1: Japanese Patent Application Laid-Open No. 2016-533140

SUMMARY OF THE INVENTION

Problems to be Solved by the Invention

In the asynchronous test method described above, an abnormal defective pixel is identified by analyzing the detection result at the time of emission of the pulse light. However, since the detection result is outputted via the arbiter that arbitrates the request from the pixel, there is a problem that it is not possible to identify which of a circuit in the pixel or the arbiter has failed even if the defective pixel is detected.

The present technology has been created in view of such a situation, and an object thereof is to identify a failure point in a solid-state image sensor in which an arbiter arbitrates a request.

Solutions to Problems

The present technology has been made to solve the problem described above, and a first aspect thereof is a solid-state image sensor including: a plurality of pixels configured to generate a request for requesting transmission of a detection signal that is predetermined, in a case where a predetermined event is detected; a test circuit configured to output the above-described request of each of the above-described plurality of pixels as an output request in a case where a test is not instructed, and generate a plurality of new requests and output each as the above-described output request in a case where the above-described test is instructed; an arbiter configured to arbitrate the above-described output request; a communication circuit configured to transmit the above-described detection signal on the basis of an arbitration result of the above-described arbiter; and a failure determination unit configured to determine whether or not the above-described arbiter has a failure on the basis of the above-described detection signal in a case where the above-described test is instructed, and a method for controlling the solid-state image sensor. Therefore, an effect is provided that it is determined whether or not the arbiter has a failure.

Furthermore, in this first aspect, the above-described test circuit may include a transistor configured to supply a predetermined potential to a signal line connected to the above-described arbiter in a case where the above-described test is instructed, and the above-described request may be outputted via the above-described signal line. Therefore, an effect is provided that a request of a predetermined potential is forcibly outputted.

Furthermore, in this first aspect, the above-described test circuit may include a logical product gate configured to output, as the above-described output request, a logical product of the above-described request and a control signal instructing the above-described test. Therefore, an effect is provided that a short circuit between a signal line that transmits a request and a ground terminal is prevented.

Furthermore, in this first aspect, the above-described plurality of pixels may be individually assigned with addresses that are mutually different, and the above-described test circuit may control to output, among the above-described new requests, one corresponding to some of the above-described addresses, as the above-described output request. Therefore, an effect is provided that a failure point in the arbiter is further identified.

Furthermore, in this first aspect, a pixel array unit in which the above-described plurality of pixels is arranged may be sectioned into regions of a predetermined number, the above-described arbiter may include an arbiter block for every piece of the above-described regions, and the above-described failure determination unit may identify, among the above-described arbiter blocks, an arbiter block having a failure on the basis of the above-described detection signal. Therefore, an effect is provided that a failure point in the arbiter is further identified.

Furthermore, in this first aspect, a part of each of the above-described pixels may be arranged on a light-receiving chip, the rest of each of the above-described pixels may be arranged on a circuit chip, and the above-described light-receiving chip may be stacked on the above-described circuit chip. Therefore, an effect of suppressing an increase in an area of the chip is suppressed.

Furthermore, a second aspect of the present technology is an imaging apparatus including: a plurality of pixels configured to generate a request for requesting transmission of a detection signal that is predetermined, in a case where a predetermined event is detected; a test circuit configured to output the above-described request of each of the above-described plurality of pixels as an output request in a case where a test is not instructed, and generate a plurality of new requests and output each as the above-described output request in a case where the above-described test is instructed; an arbiter configured to arbitrate the above-described output request; a communication circuit configured to transmit the above-described detection signal on the basis of an arbitration result of the above-described arbiter; a failure determination unit configured to determine whether or not the above-described arbiter has a failure on the basis of the above-described detection signal in a case where the above-described test is instructed; and a signal processing unit configured to execute a predetermined process on the above-described detection signal. Therefore, an effect is provided that it is determined whether or not the arbiter has a failure, and a predetermined process is executed.

Effects of the Invention

According to the present technology, in the solid-state image sensor in which the arbiter arbitrates a request, it is possible to obtain an excellent effect of determining whether or not there is a failure in the arbiter. Note that the effects described herein are not necessarily limited, and any of the effects described in the present disclosure is possible.

BRIEF DESCRIPTION OF DRAWINGS

FIG. 8 is a view showing an example of an operation of the row test circuit in the first embodiment of the present technology.

FIG. 19 is a view showing an example of an operation of the row test circuit in the first modified example of the first embodiment of the present technology.

FIG. 27 is a view showing an example of an operation of a row-side decoder according to the second embodiment of the present technology.

MODE FOR CARRYING OUT THE INVENTION

Hereinafter, embodiments for implementing the present technology (hereinafter, referred to as embodiments) will be described. The description will be made in the following order.

1. First embodiment (an example in which a request is outputted to a test circuit during a test)
2. Second embodiment (an example in which a request for a specific address is outputted to a test circuit during a test)
3. Application example to mobile object

1. First Embodiment

[Configuration Example of Imaging Apparatus]

Figure 1:
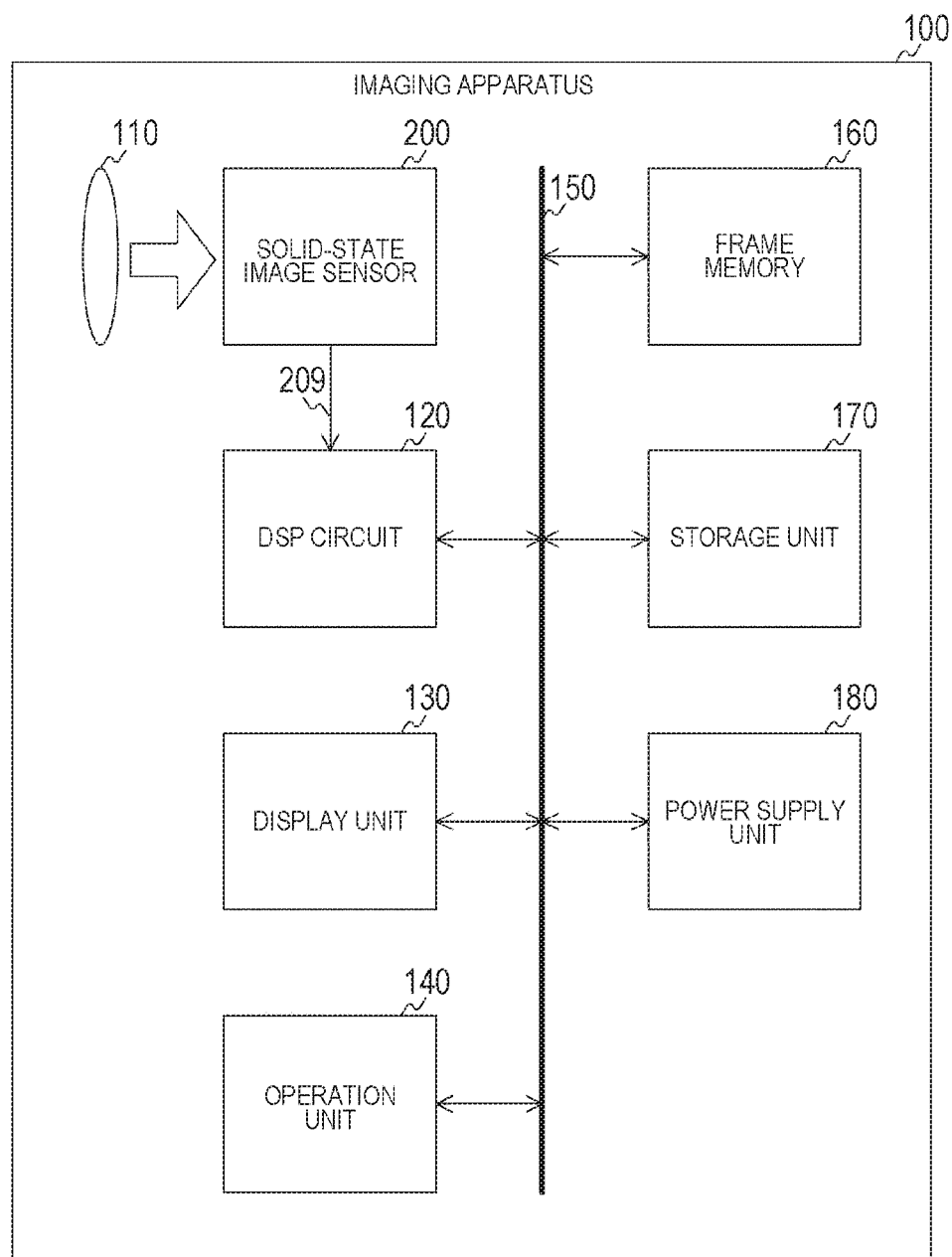
FIG. 1 is a block diagram showing a configuration example of an imaging apparatus according to a first embodiment of the present technology.

FIG. 1 is a block diagram showing a configuration example of an imaging apparatus 100 according to a first embodiment of the present technology. This imaging apparatus 100 is an apparatus that captures image data, and includes an optical unit 110, a solid-state image sensor 200, and a digital signal processor (DSP) circuit 120. The imaging apparatus 100 further includes a display unit 130, an operation unit 140, a bus 150, a frame memory 160, a storage unit 170, and a power supply unit 180. As the imaging apparatus 100, a camera mounted on an industrial robot, a vehicle-mounted camera, or the like is assumed.

The optical unit 110 is to collect light from a subject and guides to the solid-state image sensor 200. The solid-state image sensor 200 is to detect, as an address event, that an absolute value of a change amount in luminance exceeds an absolute value of a threshold value, for every pixel. This solid-state image sensor 200 generates a detection signal indicating the presence or absence of an address event for every pixel, and supplies to the DSP circuit 120 via a signal line 209.

The DSP circuit 120 is to execute predetermined signal processing on image data including a detection signal. This DSP circuit 120 outputs the processed image data and event data, to the frame memory 160 and the like via the bus 150. Note that the DSP circuit 120 is an example of a signal processing unit described in the claims.

The display unit 130 is to display image data and event data. As the display unit 130, for example, a liquid crystal panel or an organic electro-luminescence (EL) panel is assumed. The operation unit 140 is to generate an operation signal in accordance with a user operation.

The bus 150 is a common path through which the optical unit 110, the solid-state image sensor 200, the DSP circuit 120, the display unit 130, the operation unit 140, the frame memory 160, the storage unit 170, and the power supply unit 180 exchange data with each other.

The frame memory 160 is to hold image data. The storage unit 170 is to store various data such as image data. The power supply unit 180 is to supply power to the solid-state image sensor 200, the DSP circuit 120, the display unit 130, and the like.

[Configuration example of solid-state image sensor]

Figure 2:
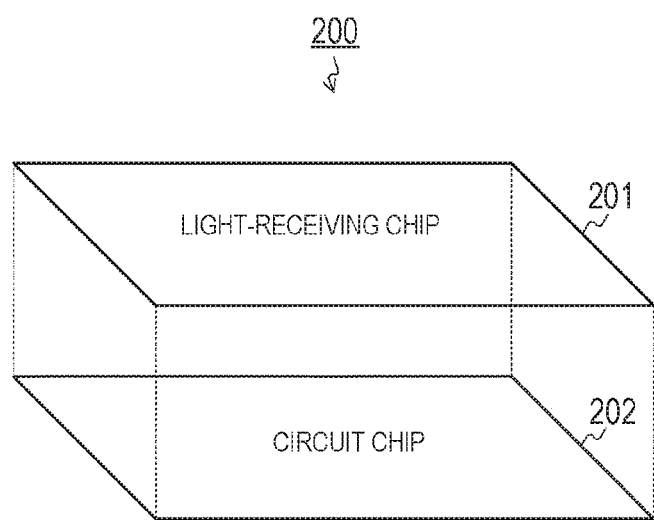
FIG. 2 is a view showing an example of a stacked structure of a solid-state image sensor according to the first embodiment of the present technology.

FIG. 2 is a view showing an example of a stacked structure of the solid-state image sensor 200 according to the first embodiment of the present technology. This solid-state image sensor 200 includes a light-receiving chip 201 and a circuit chip 202 stacked on the light-receiving chip 201.

Figure 3:
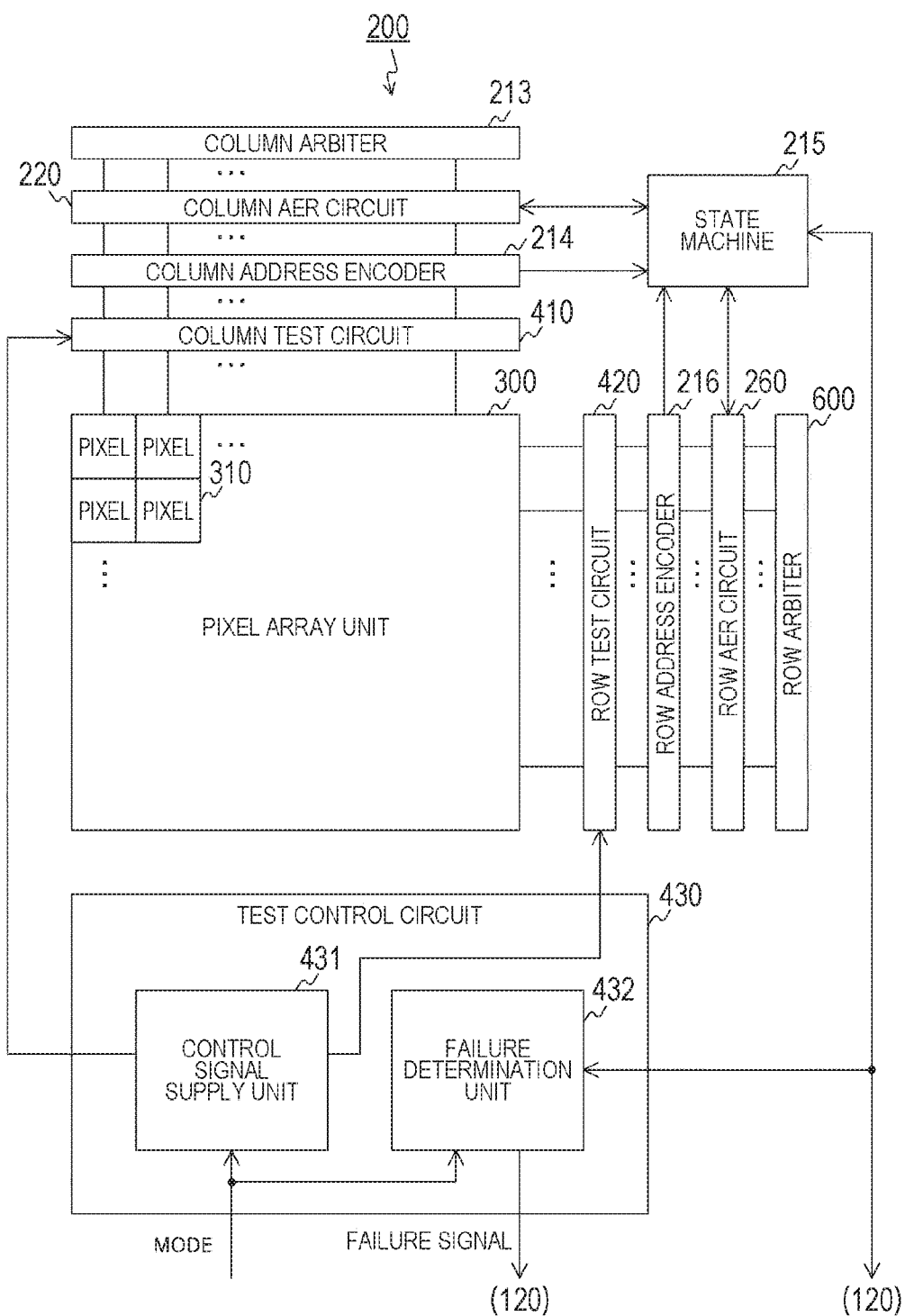
FIG. 3 is a block diagram showing a configuration example of the solid-state image sensor according to the first embodiment of the present technology.

FIG. 3 is a block diagram showing a configuration example of the solid-state image sensor 200 according to the first embodiment of the present technology. This solid-state image sensor 200 includes a column arbiter 213, a column AER circuit 220, a column address encoder 214, a pixel array unit 300, and a state machine 215. Furthermore, the solid-state image sensor 200 includes a row address encoder 216, a row AER circuit 260, a row arbiter 600, a column test circuit 410, a row test circuit 420, and a test control circuit 430. The test control circuit 430 includes a control signal supply unit 431 and a failure determination unit 432. Furthermore, in the pixel array unit 300, a plurality of pixels 310 is arranged in a two-dimensional lattice shape. Hereinafter, a set of pixels arranged in a predetermined direction in the pixel array unit 300 is referred to as a "row", and a set of pixels arranged in a direction perpendicular to the row is referred to as a "column".

The pixel 310 generates a differential signal indicating a change amount in voltage according to a photocurrent, and compares a level of the signal with a predetermined threshold value. This comparison result indicates a detection result of the address event. Here, the threshold value for comparison with the differential signal includes two mutually different threshold values, of which a larger one is defined as an upper limit threshold value and a smaller one is defined as a lower limit threshold value. Furthermore, the address event includes an ON event and an OFF event, and the detection result includes a 1-bit ON event detection result and a 1-bit OFF event detection result. The ON event is detected when the differential signal exceeds the upper limit threshold value, and the OFF event is detected when the differential signal falls below the lower limit threshold value.

The pixel 310 transmits and receives a request and a response (hereinafter, referred to as "handshake") to and from the row test circuit 420 when an address event is detected. Here, the request is a signal requesting the state machine 215 to externally transmit an address event detection signal. Next, the pixel 310 performs a handshake between with the column test circuit 410.

The column test circuit 410 is to transmit and receive a request and a response to and from the column AER circuit 220. In a case where a test is not instructed by a control signal from the test control circuit 430, this column test circuit 410 outputs requests from all rows to the column AER circuit 220 as they are. Whereas, in a case where the test is instructed, the column test circuit 410 newly generates requests for all columns and outputs to the column AER circuit 220. Furthermore, the column test circuit 410 outputs a response from the column AER circuit 220 to the pixel 310 as it is.

The row test circuit 420 is to transmit and receive a request and a response to and from the row AER circuit 260. In a case where a test is not instructed by a control signal from the test control circuit 430, this row test circuit 420 outputs requests from all rows to the row AER circuit 260 as they are. Whereas, in a case where the test is instructed, the row test circuit 420 newly generates requests for all rows and outputs to the row AER circuit 260. Furthermore, the row test circuit 420 outputs a response from the row AER circuit 260 to the pixel 310 as it is.

Note that a circuit including the column test circuit 410 and the row test circuit 420 is an example of a test circuit described in the claims.

The column arbiter 213 is to arbitrate a request from the column AER circuit 220, and transmit a response to the column AER circuit 220 on the basis of an arbitration result.

The column AER circuit 220 is to transmit and receive (handshake) a request and a response to and from each column, the column arbiter 213, and the state machine 215.

The column address encoder 214 is to encode an address of a column in which an address event has occurred, and transmit to the state machine 215.

The row address encoder 216 is to encode an address of a row in which an address event has occurred, and transmit to the state machine 215.

The row arbiter 600 is to arbitrate a request from the row AER circuit 260, and transmit a response to the row AER circuit 260 on the basis of an arbitration result. Note that the column arbiter 213 and the row arbiter 600 are examples of an arbiter described in the claims.

The row AER circuit 260 is to transmit and receive (handshake) a request and a response to and from each row, the row arbiter 600, and the state machine 215.

The state machine 215 is to transmit a detection signal on the basis of an arbitration result of the column arbiter 213 and the row arbiter 600. Upon receiving a request from the column AER circuit 220 and the row AER circuit 260, this state machine 215 decodes data from the column address encoder 214 and the row address encoder 216 to identify an address where the address event is detected. By arranging detection signals of the address event for every pixels in a two-dimensional lattice shape, image data is generated. The state machine 215 transmits the image data to the DSP circuit 120 and the failure determination unit 432. Note that the state machine 215 is an example of a communication circuit described in the claims.

The control signal supply unit 431 is to supply a control signal to each of the column test circuit 410 and the row test circuit 420, in a case where a test is instructed by a mode signal MODE. Here, the mode signal MODE is a signal indicating either a test mode in which a test of the solid-state image sensor 200 is performed or a normal mode in which no test is performed. This mode signal MODE is generated by a user operation or execution of a predetermined application.

The failure determination unit 432 is to, in a case where the test is instructed, determine whether or not there is a failure in the column arbiter 213 or the row arbiter 600 on the basis of the detection signal from the state machine 215. At a time of the test, the column test circuit 410 and the row test circuit 420 output requests for all rows and all columns, that is, all pixels. Therefore, if there is no failure in the state machine 215, and also no failure in the column arbiter 213 and the row arbiter 600, the state machine 215 transmits detection signals for all pixels. Whereas, in a case where there is no failure in the state machine 215 but there is a failure in the column arbiter 213 or the row arbiter 600, there is a possibility that the detection signals of some pixels are not to be outputted. Therefore, the failure determination unit 432 can determine whether or not there is a failure in the column arbiter 213 or the row arbiter 600 depending on whether or not the detection signals of all pixels have been transmitted.

Furthermore, by placing a modulation light source that emits pulse light on all pixels, and combining with a test method of analyzing a detection result when the pulse light is emitted, it is possible to identify whether the pixel or the arbiter has a failure.

Alternatively, without using the modulation light source, it is also possible to conduct the test by adding a selector that selects a test signal and a signal from a previous stage and outputs to a subsequent stage, in a subsequent stage of a logarithmic response unit 320, a buffer 330, and a differentiation circuit 340 in FIG. 4 described later. By combining with this test method, it is possible to identify which of each circuit in the pixel or the arbiter has a failure.

Note that the test control circuit 430 is arranged in the solid-state image sensor 200, but part or all of the circuit in the test control circuit 430 can be arranged outside the solid-state image sensor 200 (the DSP circuit 120 or the like).

[Configuration Example of Pixel]

Figure 4:
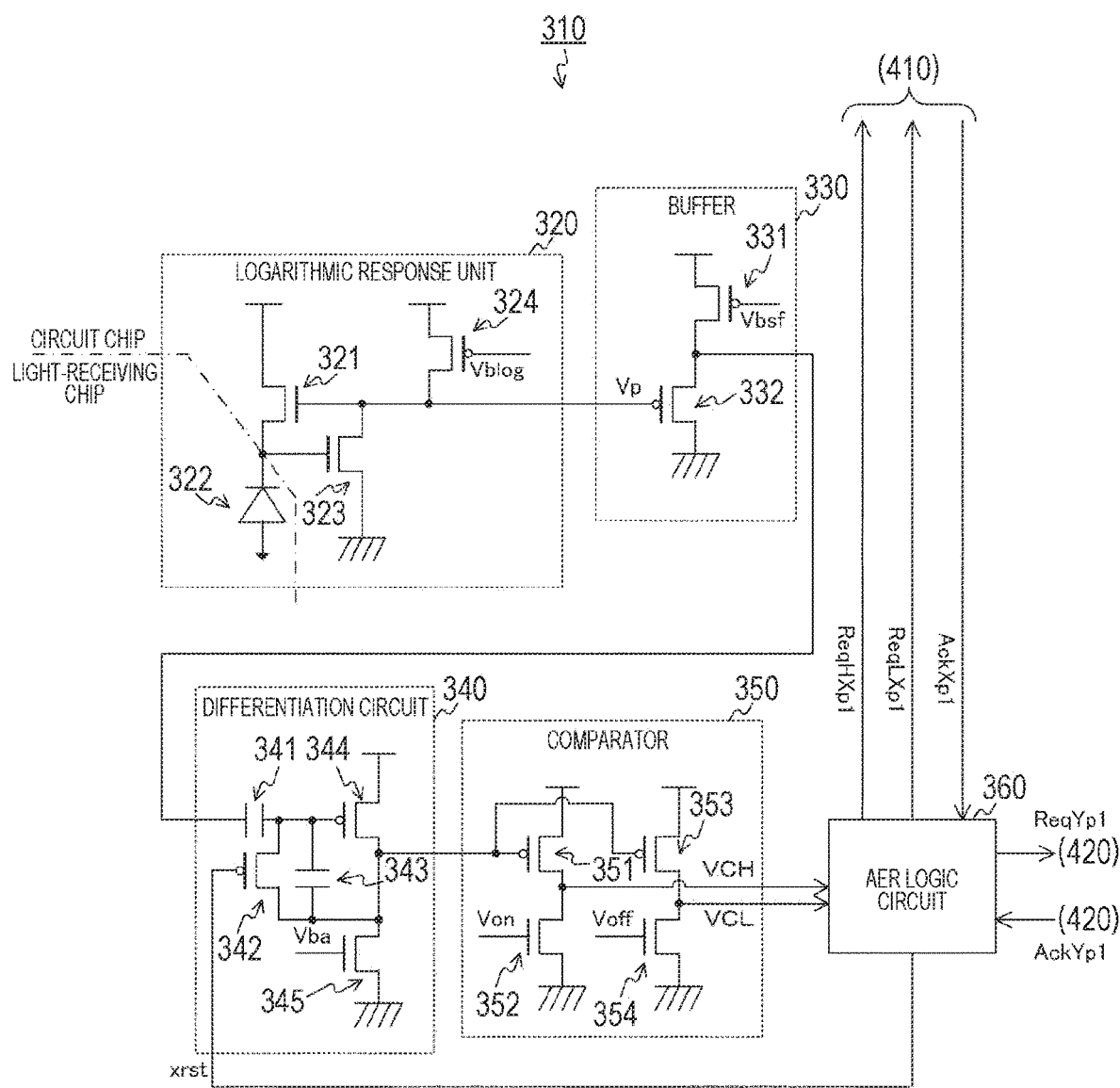
FIG. 4 is a circuit diagram showing a configuration example of a pixel according to the first embodiment of the present technology.

FIG. 4 is a circuit diagram showing a configuration example of the pixel 310 according to the first embodiment of the present technology. This pixel 310 includes the logarithmic response unit 320, the buffer 330, the differentiation circuit 340, a comparator 350, and an AER logic circuit 360.

The logarithmic response unit 320 includes negative channel MOS (nMOS) transistors 321 and 323, a photodiode 322, and a positive channel MOS (pMOS) transistor 324.

The photodiode 322 is to generate a photocurrent by photoelectric conversion of incident light. The pMOS transistor 324 and the nMOS transistor 323 are connected in series between a power supply and a ground terminal. Furthermore, a gate of the nMOS transistor 321 is connected to a connection point between the pMOS transistor 324 and the nMOS transistor 323, a source is connected to the photodiode 322, and a drain is connected to a power supply terminal. Then, a bias voltage Vblog is applied to a gate of the pMOS transistor 324. With such a connection, a photocurrent flowing through the photodiode 322 is logarithmically converted into a voltage Vp.

Furthermore, the photodiode 322 is arranged on the light-receiving chip 201, and other circuits are arranged on the circuit chip 202. Furthermore, a ground of the light-receiving chip 201 and a ground of the circuit chip 202 are separated from each other, as a countermeasure against interference.

Furthermore, the buffer 330 includes pMOS transistors 331 and 332 connected in series between a power supply and a ground terminal. A gate of the pMOS transistor 332 on the ground side is connected with the logarithmic response unit 320, and a bias voltage Vbsf is applied to a gate of the pMOS transistor 331 on the power supply side. Furthermore, a connection point between the pMOS transistors 331 and 332 is connected to the differentiation circuit 340. With this connection, impedance conversion on Vp is performed.

The differentiation circuit 340 includes capacitors 341 and 343, pMOS transistors 342 and 344, and an nMOS transistor 345.

One end of the capacitor 341 is connected to the buffer 330, and another end is connected to one end of the capacitor 343 and a gate of the pMOS transistor 344. To the gate of the pMOS transistor 342, a reset signal xrst is inputted, and a source and a drain are connected to both ends of the capacitor 343. The pMOS transistor 344 and the nMOS transistor 345 are connected in series between a power supply and a ground terminal. Furthermore, another end of the capacitor 343 is connected to a connection point between the pMOS transistor 344 and the nMOS transistor 345. To a gate of the nMOS transistor 345 on the ground side, a bias voltage Vba is applied, and the connection point between the pMOS transistor 344 and the nMOS transistor 345 is also connected to the comparator 350. With such a connection, a differential signal is generated and outputted to the comparator 350. Furthermore, the differential signal is initialized with the reset signal xrst.

The comparator 350 includes pMOS transistors 351 and 353 and nMOS transistors 352 and 354. The pMOS transistor 351 and the nMOS transistor 352 are connected in series between a power supply and a ground terminal, and the pMOS transistor 353 and the nMOS transistor 354 are also connected in series between a power supply and a ground terminal. Furthermore, gates of the pMOS transistors 351 and 353 are connected to the differentiation circuit 340. To a gate of the nMOS transistor 352, a predetermined upper limit threshold value Von is applied, and, to a gate of the nMOS transistor 354, a predetermined lower limit threshold value Voff is applied.

A connection point between the pMOS transistor 351 and the nMOS transistor 352 is connected to the AER logic circuit 360, and a voltage at this connection point is outputted as a comparison result VCH. A connection point between the pMOS transistor 353 and the nMOS transistor 354 is also connected to the AER logic circuit 360, and a voltage at this connection point is outputted as a comparison result VCL. With such a connection, the comparator 350 outputs the comparison result VCH of high level in a case where a differential signal exceeds the upper limit threshold value Von, and outputs the comparison result VCL of low level in a case where the differential signal falls below the lower limit threshold value Voff. This comparison result VCH indicates a detection result of the ON event, and the comparison result VCL indicates a detection result of the OFF event.

Note that the comparator 350 detects both the ON event and the OFF event, but the comparator 350 may detect only one of the ON event and the OFF event. For example, when detecting only the ON event, only the corresponding pMOS transistor 351 and nMOS transistor 352 are arranged.

The AER logic circuit 360 is to perform a handshake on the basis of the comparison results VCH and VCL. This AER logic circuit 360 performs a handshake between with the row AER circuit 260 in a case where an address event occurs. Next, the AER logic circuit 360 performs a handshake between with the column AER circuit 220, and resets the differentiation circuit 340 with the reset signal xrst.

Figure 5:
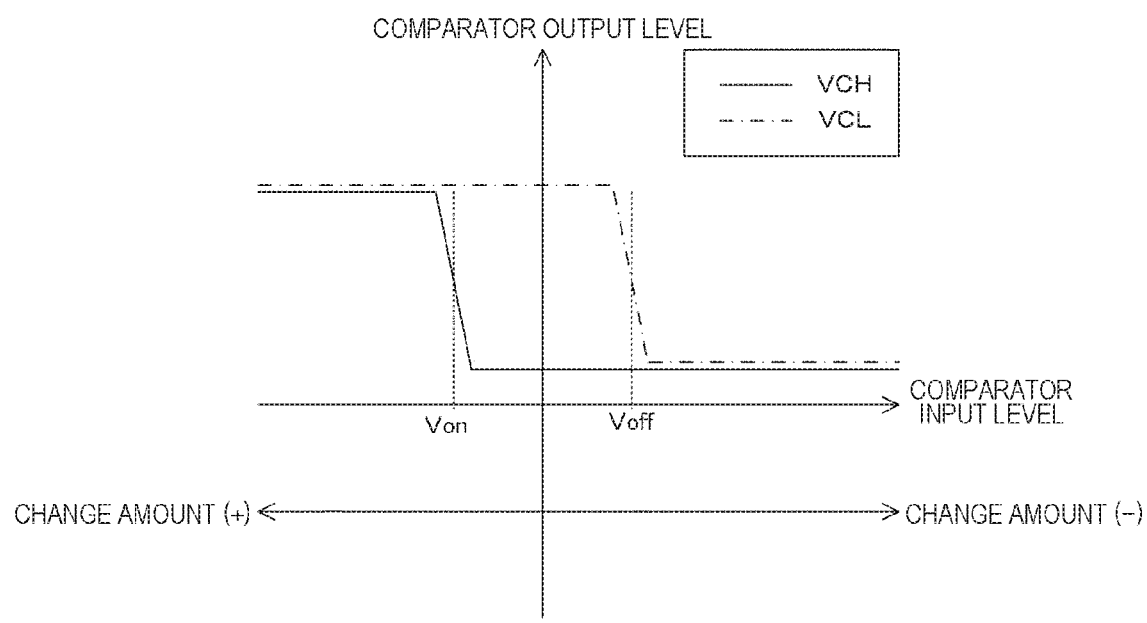
FIG. 5 is a graph showing an example of input/output characteristics of a comparator according to the first embodiment of the present technology.

FIG. 5 is a graph showing an example of input/output characteristics of the comparator 350 according to the first embodiment of the present technology. In the figure, a vertical axis indicates a level of an output signal (VCH or VCL) of the comparator 350, and a horizontal axis indicates a level of an input signal (differential signal) of the comparator 350. Furthermore, a solid line indicates a locus of the comparison result VCH, and a dashed line indicates a locus of the comparison result VCL.

When a change amount in voltage according to luminance (that is, the differential signal) exceeds the upper limit threshold value Von, the comparison result VCH changes from low level to high level, and the ON event is detected. Whereas, when the differential signal falls below the lower limit threshold value Voff, the comparison result VCL changes from high level to low level, and the OFF event is detected.

[Configuration Example of AER Logic Circuit]

Figure 6:
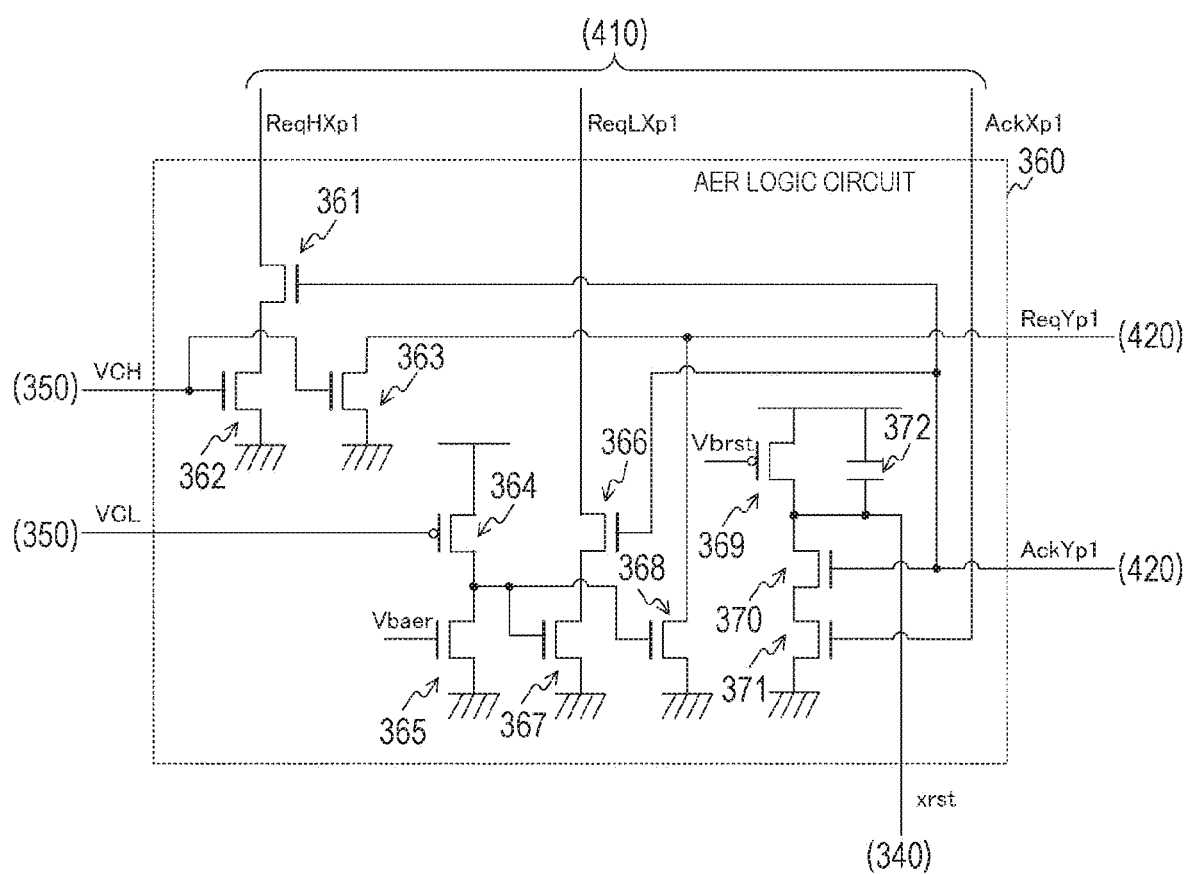
FIG. 6 is a block diagram showing a configuration example of an address event representation (AER) logic circuit according to the first embodiment of the present technology.

FIG. 6 is a block diagram showing a configuration example of the AER logic circuit 360 in the first embodiment of the present technology. This AER logic circuit 360 includes nMOS transistors 361 to 363, 365 to 368, 370, and 371, pMOS transistors 364 and 369, and a capacitor 372.

The nMOS transistors 361 and 362 are connected in series. To gates of the nMOS transistors 362 and 363, the comparison result VCH is inputted, and, to a gate of the nMOS transistor 361, a response AckYp1 is inputted. Furthermore, sources of the nMOS transistors 362 and 363 are grounded, and a request ReqHXp1 is outputted from a drain of the nMOS transistor 361 to the column test circuit 410. From a drain of the nMOS transistor 363 to the row test circuit 420, a request ReqYp1 is outputted.

The pMOS transistor 364 and the nMOS transistor 365 are connected in series between a power supply and a ground terminal. Furthermore, the comparison result VCL is inputted to a gate of the pMOS transistor 364, and a bias voltage Vbaer is applied to a gate of the nMOS transistor 365.

The nMOS transistors 366 and 367 are connected in series. Gates of the nMOS transistors 367 and 368 are connected to a connection point between the pMOS transistor 364 and the nMOS transistor 365. To a gate of the nMOS transistor 366, the response AckYp1 is inputted. Furthermore, sources of the nMOS transistors 367 and 368 are grounded, and a request ReqLXp1 is outputted from a drain of the nMOS transistor 366 to the column test circuit 410. From a drain of the nMOS transistor 368 to the row test circuit 420, the request ReqYp1 is outputted.

The pMOS transistor 369 and the nMOS transistors 370 and 371 are connected in series between a power supply and a ground terminal. Furthermore, to a gate of the pMOS transistor 369, a bias voltage Vbrst is applied. To a gate of the nMOS transistor 370, the response AckYp1 is inputted, and, to a gate of the nMOS transistor 371, a response AckXp1 is inputted. One end of the capacitor 372 is connected to a power supply, and another end is connected to a connection point between the pMOS transistor 369 and the nMOS transistor 370. Furthermore, a voltage at the connection point between the pMOS transistor 369 and the nMOS transistor 370 is outputted to the differentiation circuit 340 as the reset signal xrst.

With the configuration described above, when the comparison result VCH of high level is inputted (that is, the ON event is detected), the AER logic circuit 360 transmits the request ReqYp1 of low level to the row AER circuit 260. Then, upon receiving the response AckYp1 of high level from the row test circuit 420, the AER logic circuit 360 transmits the request ReqHXp1 of low level to the column AER circuit 410. Then, upon receiving the response AckXp1 of high level from the column test circuit 410, the AER logic circuit 360 outputs the reset signal xrst of low level to the differentiation circuit 340.

Furthermore, when the comparison result VCL of low level is inputted (that is, the OFF event is detected), the AER logic circuit 360 transmits the request ReqYp1 of low level to the row test circuit 420. Then, upon receiving the response AckYp1 of high level from the row test circuit 420, the AER logic circuit 360 transmits the request ReqLXp1 of low level to the column test circuit 410. Then, upon receiving the response AckXp1 of high level from the column test circuit 410, the AER logic circuit 360 outputs the reset signal xrst of low level to the differentiation circuit 340.

Figure 7:
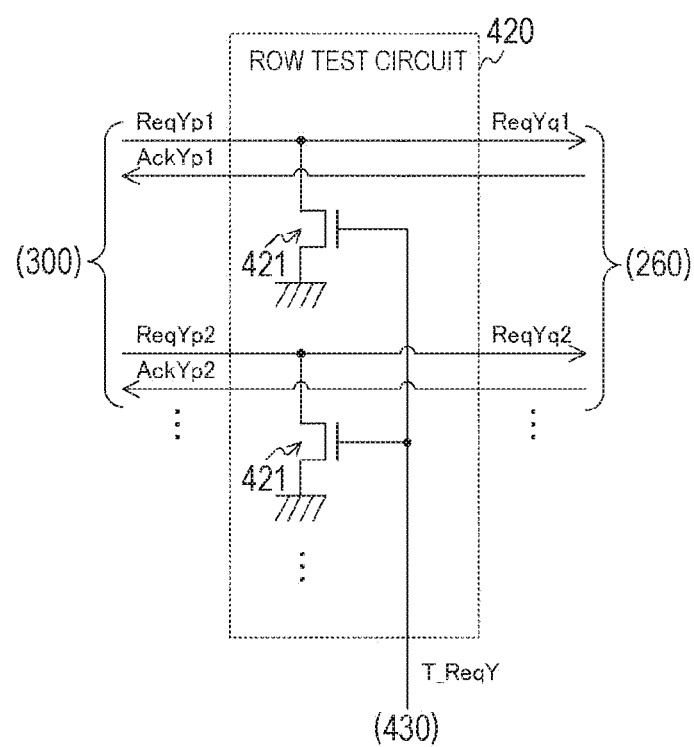
FIG. 7 is a circuit diagram showing a configuration example of a row test circuit according to the first embodiment of the present technology.

FIG. 7 is a circuit diagram showing a configuration example of the row test circuit 420 according to the first embodiment of the present technology. In this row test circuit 420, an nMOS transistor 421 is arranged for every row.

The nMOS transistor 421 is to supply a predetermined potential to a signal line that transmits a request of a corresponding row in accordance with a control signal T_ReqY from the test control circuit 430. In a case where a low level signal is transmitted as a request, low level (ground potential or the like) is supplied to the signal line.

In a case where a test is instructed, the test control circuit 430 transmits the control signal T_ReqY of high level. Therefore, regardless of the request ReqYp1 in the first row of the pixel array unit 300, the signal line is forcibly controlled to low level, and a request ReqYq1 of low level is outputted to the row AER circuit 260. This similarly applies to the second and subsequent rows. Note that the request ReqYp1 is an example of an output request described in the claims.

Whereas, in a case where the test is not instructed, the test control circuit 430 transmits the control signal T_ReqY of low level. Therefore, the request ReqYp1 in the first row of the pixel array unit 300 is outputted as it is to the row AER circuit 260 as the request ReqYq1. This similarly applies to the second and subsequent rows.

Furthermore, the response AckYp1 of the first row from the row AER circuit 260 is supplied to the pixel array unit 300 as it is. This similarly applies to the second and subsequent rows.

FIG. 8 is a view showing an example of an operation of the row test circuit 420 in the first embodiment of the present technology. In a case where the control signal T_ReqY is low level, the row test circuit 420 performs through-output on the request ReqYp1 as it is as the request ReqYq1.

Whereas, in a case where the control signal T_ReqY is high level, the row test circuit 420 forcibly outputs the request ReqYq1 of low level indicating that there is a request, regardless of the request ReqYp1.

[Configuration Example of Column Test Circuit]

Figure 9:
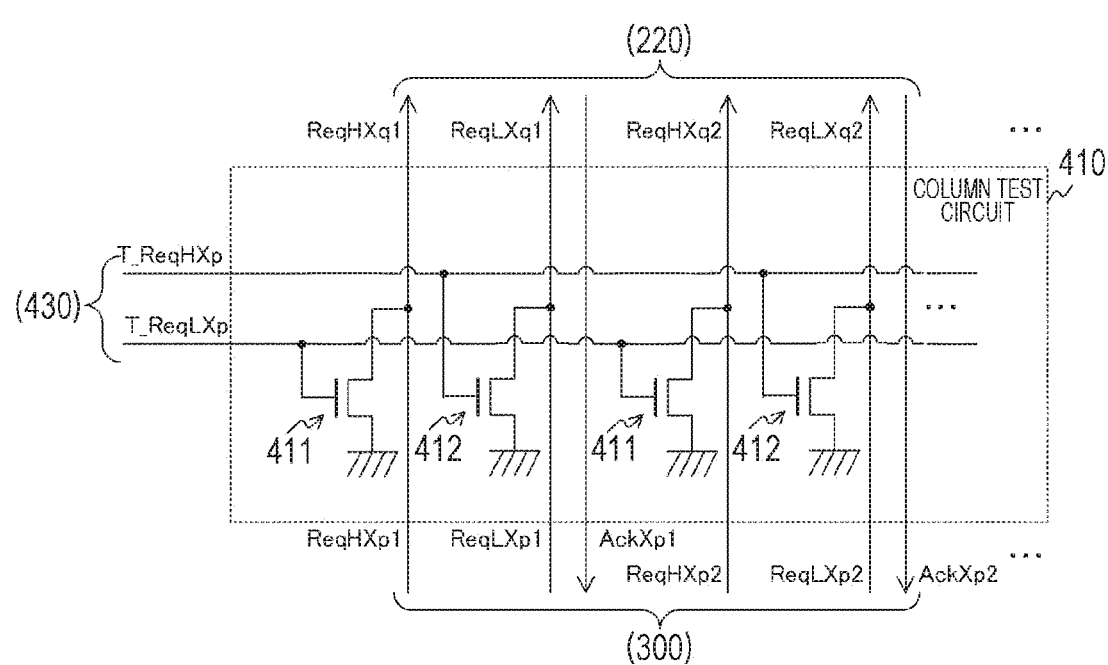
FIG. 9 is a circuit diagram showing a configuration example of a column test circuit according to the first embodiment of the present technology.

FIG. 9 is a circuit diagram showing a configuration example of the column test circuit 410 according to the first embodiment of the present technology. In this column test circuit 410, nMOS transistors 411 and 412 are arranged for every row.

The nMOS transistor 411 is to supply a predetermined potential (ground potential or the like) to a signal line that transmits a request of a corresponding column in accordance with a control signal T_ReqLXp from the test control circuit 430. The nMOS transistor 412 is to supply a predetermined potential to a signal line that transmits a request of a corresponding column in accordance with a control signal T_ReqHXp from the test control circuit 430.

In a case where a test is instructed, the test control circuit 430 sets one of the control signals T_ReqLXp and T_ReqHXp to high level and another to low level. In a case of outputting a detection signal of the ON event, the control signal T_ReqHXp is controlled to high level, and in a case of outputting a detection signal of the OFF event, the control signal T_ReqLXp is controlled to high level. With these control signals, a request ReqLXq1 of low level or a ReqHXq1 of low level is outputted to the column AER circuit 220. This similarly applies to the second and subsequent rows. Note that requests ReqLXq1 and ReqHXq1 are an example of an output request described in the claims.

Whereas, in a case where the test is not instructed, the test control circuit 430 transmits the control signals T_ReqLXp and T_ReqHXp of low level. Therefore, the requests ReqLXp1 and ReqHXp1 in the first row of the pixel array unit 300 are outputted to the column AER circuit 220 as they are as the requests ReqLXq1 and ReqHXq1. This similarly applies to the second and subsequent rows.

Note that, as described above, in the column test circuit 410 and the row test circuit 420, the potential is forcibly set to low level even in a case where a signal line that transmits the request is not low level. If a response (such as the AckYp1) is returned at this time, the response is returned even though the request has not been originally sent, which may lead to an unexpected pixel state to cause a state of a deadlock and the like. Therefore, in the test mode, it is desirable that the test control circuit 430 causes all pixels to be in a reset state. For example, the test control circuit 430 causes the reset state by inputting a high-level bias voltage Vbrst in the AER logic circuit 360 illustrated in FIG. 6.

[Configuration Example of Row AER Circuit]

Figure 10:
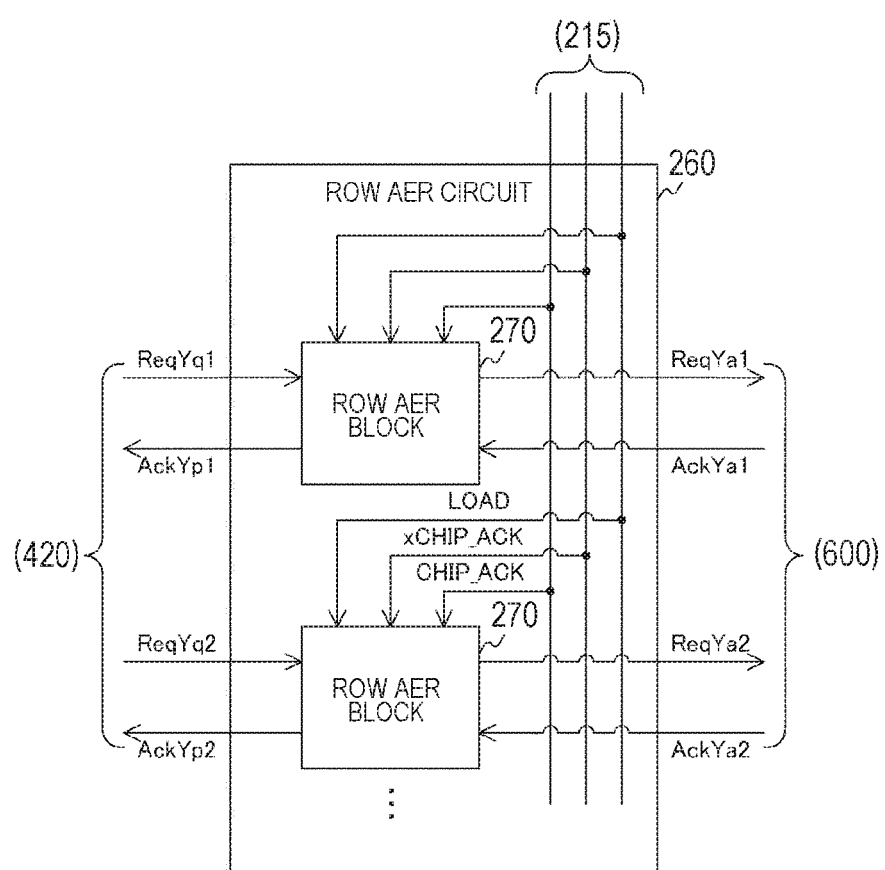
FIG. 10 is a block diagram showing a configuration example of a row AER circuit according to the first embodiment of the present technology.

FIG. 10 is a block diagram showing a configuration example of the row AER circuit 260 according to the first embodiment of the present technology. The row AER circuit 260 includes a row AER block 270 for every row. The row AER block 270 is to perform a handshake between with a corresponding row, the row arbiter 600, and the state machine 215.

[Configuration Example of Row AER Block]

Figure 11:
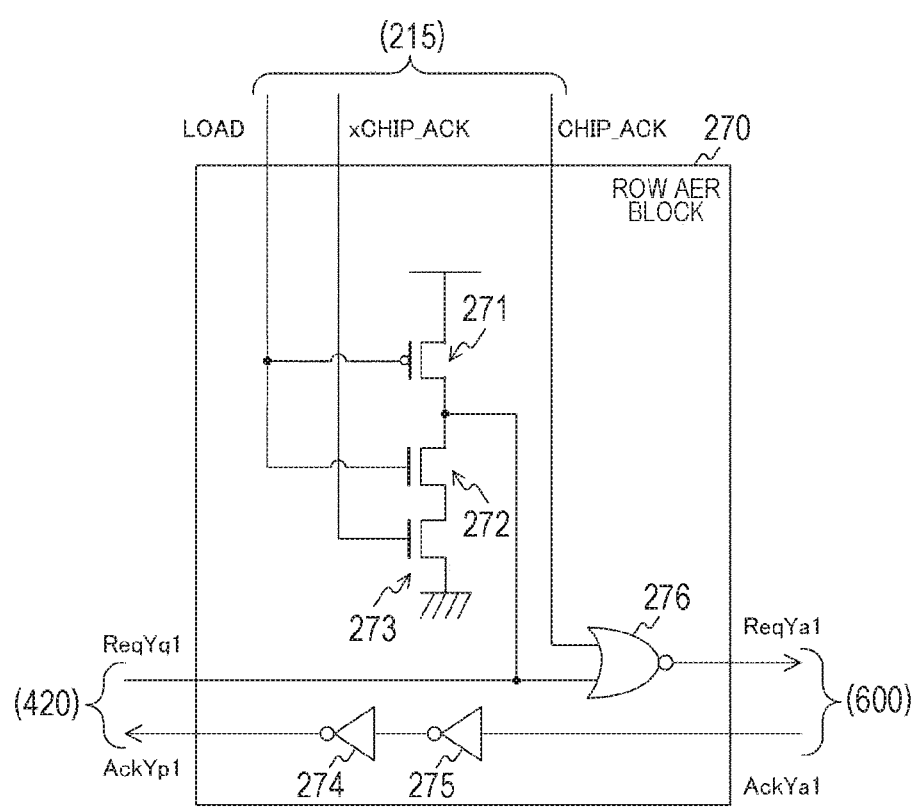
FIG. 11 is a circuit diagram showing a configuration example of a row AER block according to the first embodiment of the present technology.

FIG. 11 is a circuit diagram showing a configuration example of the row AER block 270 in the first embodiment of the present technology. This row AER block 270 includes a pMOS transistor 271, nMOS transistors 272 and 273, a negative logical sum (NOR) gate 276, and inverters 274 and 275.

The pMOS transistor 271 and the nMOS transistors 272 and 273 are connected in series between a power supply and a ground terminal. Furthermore, to gates of the pMOS transistor 271 and the nMOS transistor 272, a control signal LOAD from the state machine 215 is inputted. The control signal LOAD is a signal for instructing reading of a detection result of an address event. Furthermore, to the gate of the nMOS transistor 273, xCHIP_ACK obtained by inverting a response CHIP_ACK from the state machine 215 is inputted.

The NOR gate 276 is to output a negative logical sum of two input values to the row arbiter 600 as a request ReqYa1. To one of input terminals of the NOR gate 276, the response CHIP_ACK from the state machine 215 is inputted. Another input terminal of the NOR gate 276 is connected to a connection point between the pMOS transistor 271 and the nMOS transistor 272 and to a signal line that transmits the request ReqYq1 from the row test circuit 420.

The inverter 275 is to invert a response AckYa1 from the row arbiter 600 and output to the inverter 274. The inverter 274 is to invert a signal from the inverter 275 and output as the response AckYp1 to the row test circuit 420.

With the configuration described above, when the request ReqYq1 of low level is inputted, the row AER block 270 outputs the request ReqYa1 of low level if the response CHIP_ACK is high level. Furthermore, the row AER block 270 delays the high-level response AckYa1 and outputs as the response AckYp1.

[Configuration Example of Column AER Circuit]

Figure 12:
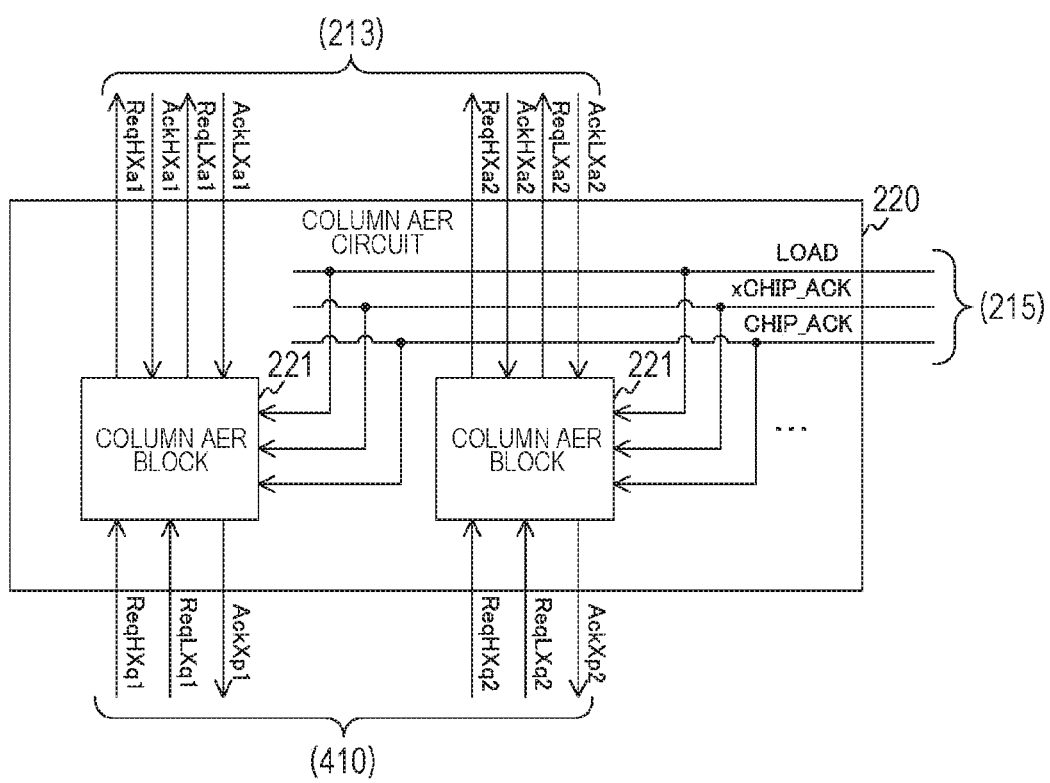
FIG. 12 is a block diagram showing a configuration example of a column AER circuit according to the first embodiment of the present technology.

FIG. 12 is a block diagram showing a configuration example of the column AER circuit 220 according to the first embodiment of the present technology. This column AER circuit 220 includes a column AER block 221 for every column. The column AER block 221 is to perform a handshake between with a corresponding column, the state machine 215, and the column arbiter 213.

[Configuration Example of Column AER Block]

Figure 13:
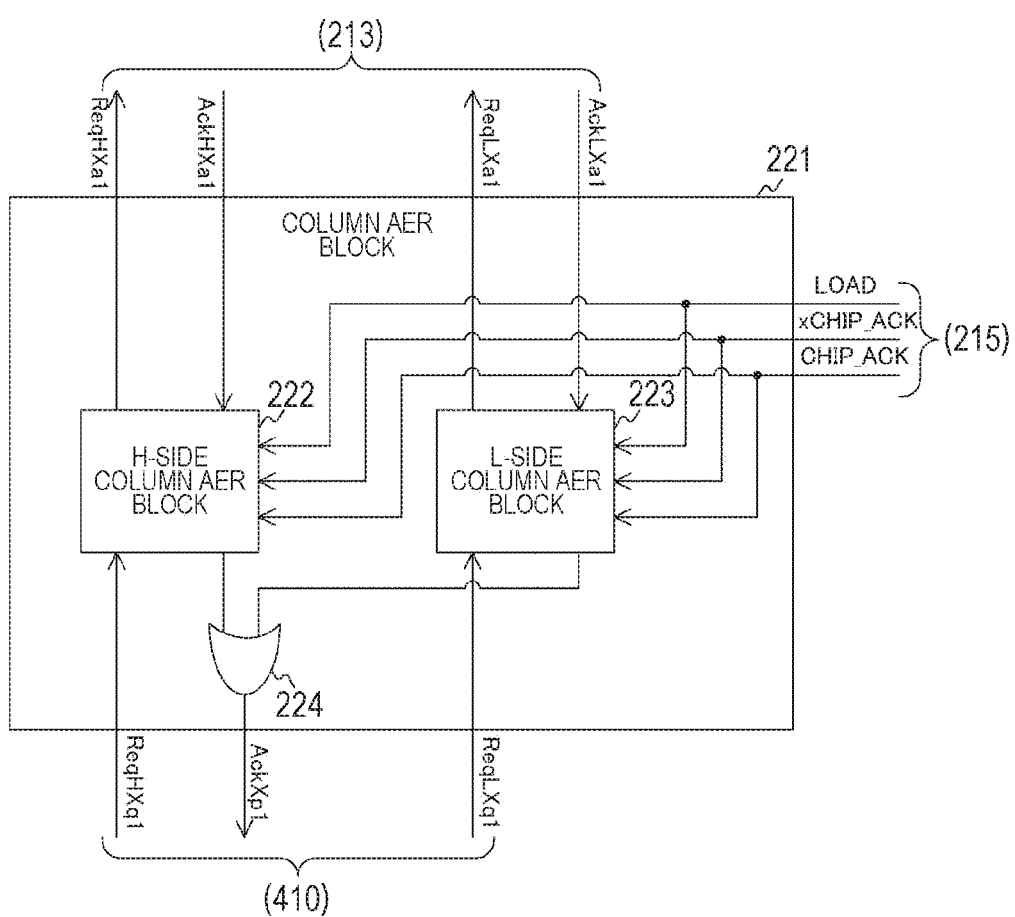
FIG. 13 is a block diagram showing a configuration example of a column AER block according to the first embodiment of the present technology.

FIG. 13 is a block diagram showing a configuration example of the column AER block 221 according to the first embodiment of the present technology. The column AER block 221 includes an H-side column AER block 222, an L-side column AER block 223, and a logical sum (OR) gate 224.

The H-side column AER block 222 is to perform a handshake when a request ReqHXq1 of low level is inputted. The H-side column AER block 222 outputs a signal obtained by delaying a high-level response AckHXa1 to the OR gate 224. The L-side column AER block 223 is to perform a handshake when a request ReqLXq1 of low level is inputted. The L-side column AER block 223 outputs a signal obtained by delaying a high-level response AckLXa1 to the OR gate 224. Furthermore, the H-side column AER block 222 and the L-side column AER block 223 invert a low-level request from the pixel array unit 300. Configurations of these H-side column AER block 222 and L-side column AER block 223 are similar to that of the row AER block 270 illustrated in FIG. 11. Note that configurations of these row and column AER blocks are not limited to a circuit illustrated in FIG. 12 as long as handshake can be performed.

The OR gate 224 is to output a logical sum of signals from the H-side column AER block 222 and the L-side column AER block 223 as the response AckXp1.

[Configuration Example of Row Arbiter]

Figure 14:
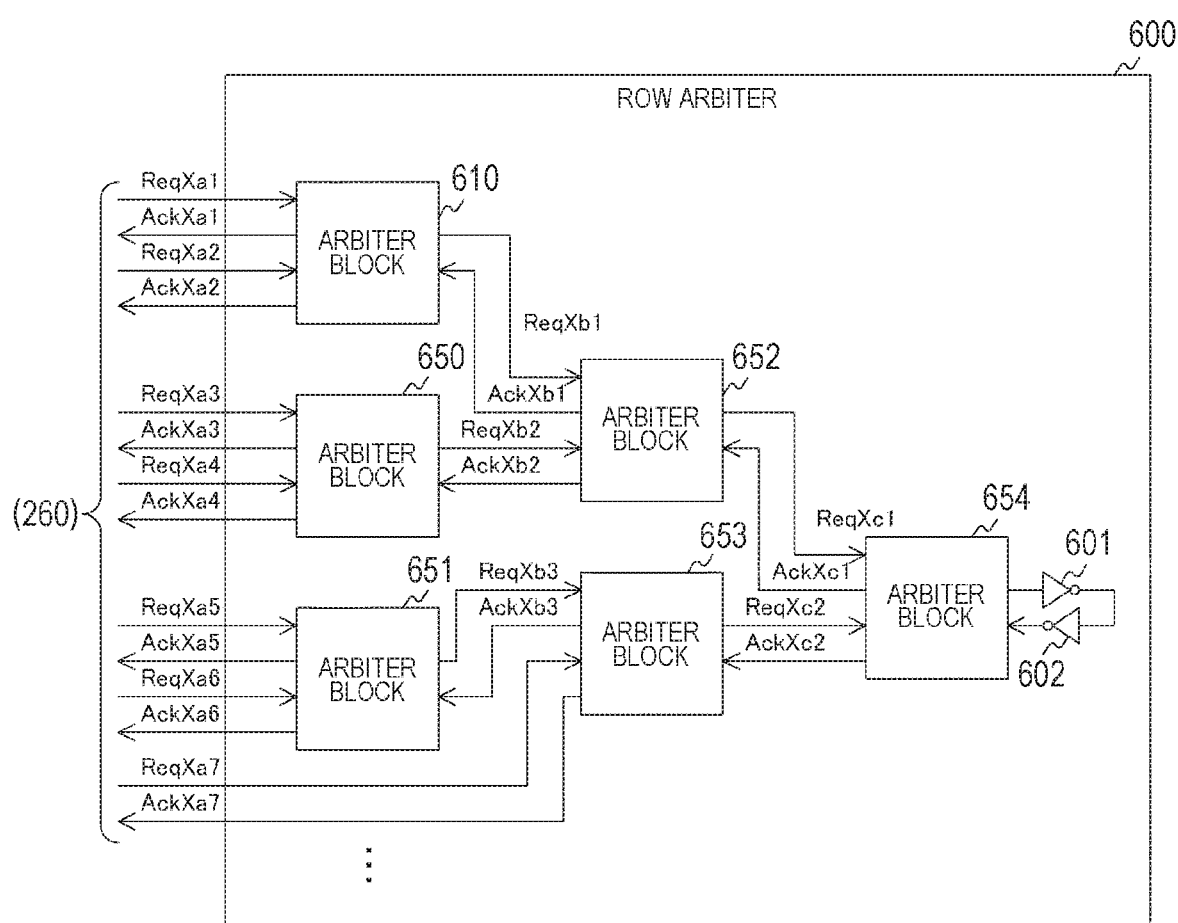
FIG. 14 is a block diagram showing a configuration example of a row arbiter in the first embodiment of the present technology.

FIG. 14 is a block diagram showing a configuration example of the row arbiter 600 in the first embodiment of the present technology. This row arbiter 600 includes arbiter blocks 610 and 650 to 654 and inverters 601 and 602. Note that the figure is a diagram in a case where the number of vertical event-driven pixels is seven pixels. For example, when the number of vertical event-driven pixels is 1000 pixels, an arbiter having 10 stages is provided to cover up to 2^10 stages (=1024 pixels).

The arbiter block 610 is to arbitrate a request from the first row and a request from the second row. This arbiter block 610 performs a handshake between with the arbiter block 652, and outputs a response to the first or second row on the basis of an arbitration result.

The arbiter block 650 is to arbitrate a request from the third row and a request from the fourth row. The arbiter block 650 performs a handshake between with the arbiter block 652, and outputs a response to the third or fourth row on the basis of an arbitration result.

The arbiter block 651 is to arbitrate a request from the fifth row and a request from the sixth row. This arbiter block 651 performs a handshake between with the arbiter block 653, and outputs a response to the fifth or sixth row on the basis of an arbitration result.

The arbiter block 652 is to arbitrate a request from the arbiter block 610 and a request from the arbiter block 650. The arbiter block 652 performs a handshake between with the arbiter block 654, and outputs a response to the arbiter block 610 or 650 on the basis of an arbitration result.

The arbiter block 653 is to arbitrate a request from the arbiter block 651 and a request from the seventh row. This arbiter block 653 performs a handshake between with the arbiter block 654, and outputs a response to the arbiter block 651 or the seventh row on the basis of an arbitration result.

The arbiter block 654 is to arbitrate a request from the arbiter block 652 and a request from the arbiter block 653. The arbiter block 654 supplies a response to an earlier request to the arbiter block 652 or 653 after being delayed by the inverters 601 and 602.

Note that a configuration of the column arbiter 213 is similar to that of the row arbiter 600. Furthermore, the configuration of these arbiters is not limited to the configuration illustrated in the figure as long as requests can be arbitrated.

Figure 15:
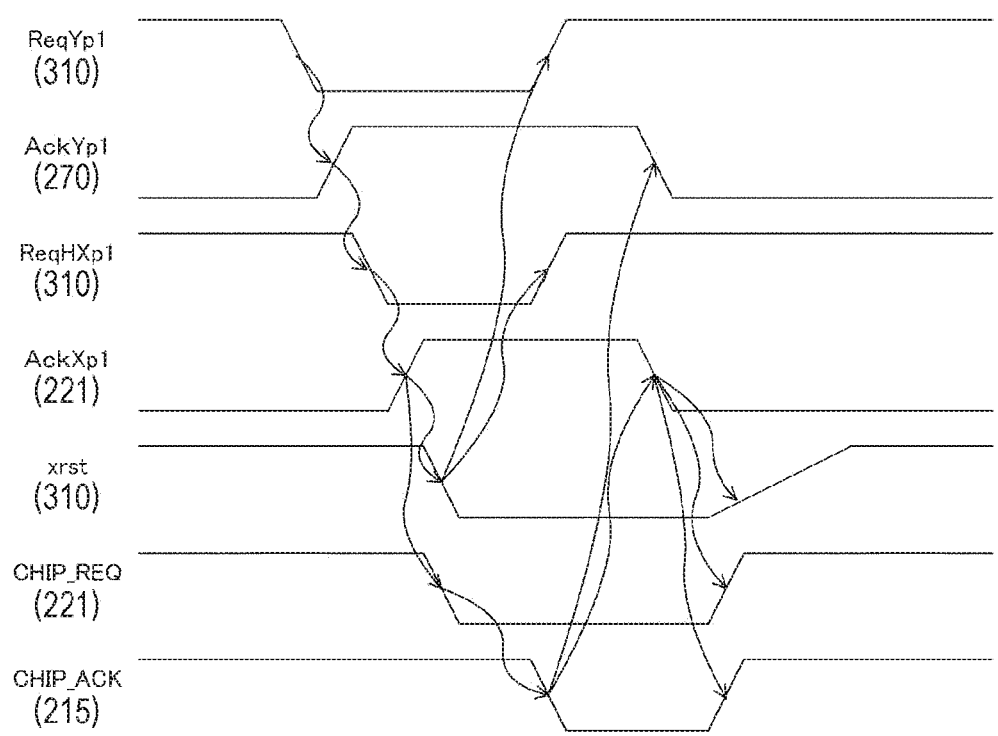
FIG. 15 is a timing chart showing an example of a handshake according to the first embodiment of the present technology.

FIG. 15 is a timing chart showing an example of a handshake according to the first embodiment of the present technology. When the pixel 310 outputs the request ReqYp1 of low level, the row AER block 270 returns the response AckYp1 of high level if the response CHIP_ACK is high level.

Upon receiving the response AckYp1, the pixel 310 outputs the request ReqHXp1 of low level in a case where an ON event occurs. Note that, in a case where an OFF event occurs, the request ReqLXp1 of low level is outputted.

Upon receiving the request ReqHXp1, the column AER block 221 returns the response AckXp1 of high level if the response CHIP_ACK is high level. Upon receiving the response AckXp1, the pixel 310 generates the reset signal xrst of low level and initializes the requests ReqYp1 and ReqHXp1 to high level.

Furthermore, when the response AckXp1 is outputted, the column AER block 221 outputs a request CHIP_REQ of low level. Upon receiving the request CHIP_REQ, the state machine 215 transfers a detection result of an address event to the DSP circuit 120, and returns the response CHIP_ACK of low level.

Upon receiving the response CHIP_ACK, the row AER block 270 initializes the response AckYp1 to low level if the request ReqYp1 is high level. Furthermore, upon receiving the response CHIP_ACK, the column AER block 221 initializes the response AckXp1 to low level if the request ReqHXp1 is high level.

When the response AckXp1 is initialized, the pixel 310 initializes the reset signal xrst to high level, and the column AER block 221 initializes the request CHIP_REQ to high level. Furthermore, the state machine 215 initializes the response CHIP_ACK to high level.

[Operation Example of Solid-State Image Sensor]

Figure 16:
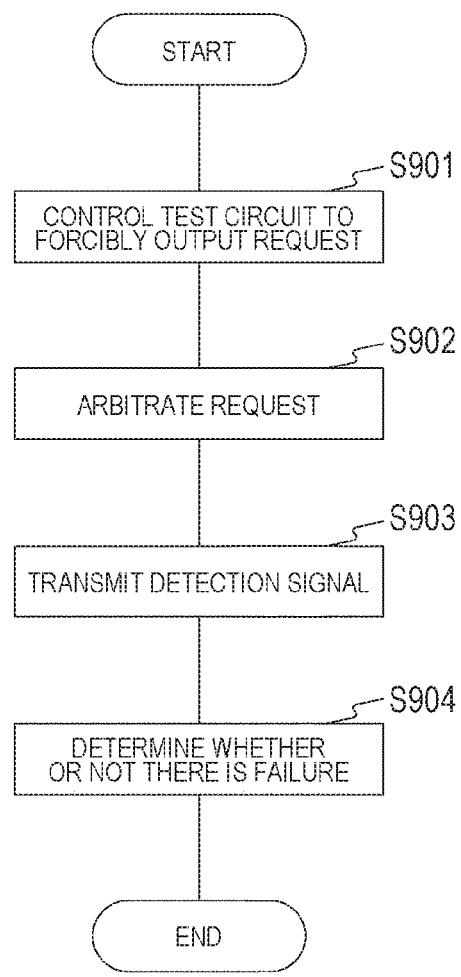
FIG. 16 is a flowchart showing an example of an operation of the solid-state image sensor according to the first embodiment of the present technology.

FIG. 16 is a flowchart showing an example of an operation of the solid-state image sensor 200 according to the first embodiment of the present technology. This operation is started, for example, when a test is instructed by the mode signal MODE.

The test control circuit 430 in the solid-state image sensor 200 controls the column test circuit 410 and the row test circuit 420 to forcibly output requests for all rows and all columns (step S901). Then, the column arbiter 213 and the row arbiter 600 arbitrate those requests (step S902).

The state machine 215 transmits a detection signal for every pixel on the basis of an arbitration result (step S903). The test control circuit 430 determines whether or not there is a failure in the column arbiter 213 and the row arbiter 600 on the basis of those detection signals (step S904). After step S904, the solid-state image sensor 200 stops the operation for the test.

Thus, according to the first embodiment of the present technology, since the column test circuit 410 and the row test circuit 420 generate requests and supply to the arbiter during the test, it is possible to determine whether or not the arbiter has a failure from an arbitration result of the requests by the arbiter. Therefore, it is possible to determine which of the pixel or the arbiter has a failure, and thus it is possible to identify a failure point in the solid-state image sensor including those.

First Modified Example

In the first embodiment described above, the test control circuit 430 controls to output a low-level request by shifting the nMOS transistors 411 and 421 to the ON state during the test. However, in this configuration, a signal line that transmits a request and a ground terminal are short-circuited during the test, which may increase power consumption. A first modified example of the first embodiment is different from the first embodiment in that an AND gate is arranged instead of the nMOS transistor 411 or the like, to suppress an increase in power consumption.

Figure 17:
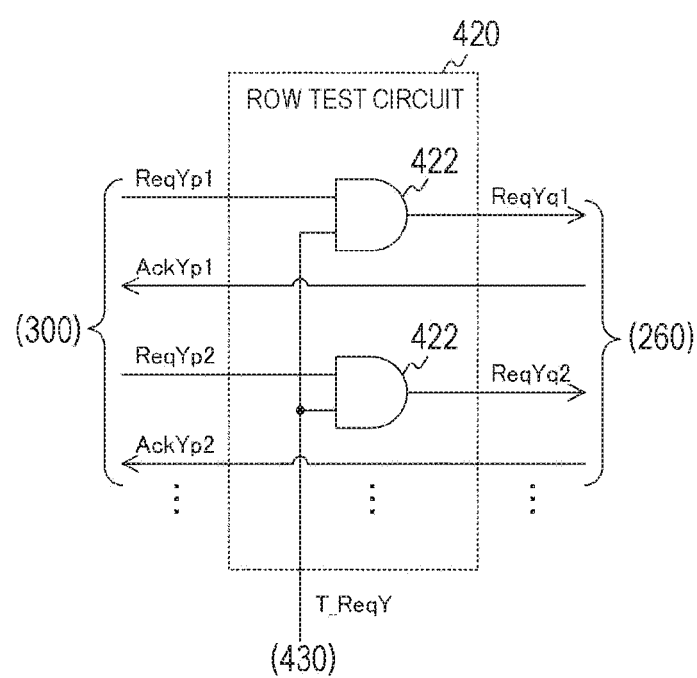
FIG. 17 is a circuit diagram showing a configuration example of a row test circuit in a first modified example of the first embodiment of the present technology.

FIG. 17 is a circuit diagram showing a configuration example of a row test circuit 420 in the first modified example of the first embodiment of the present technology. The row test circuit 420 of the modified example of the first embodiment is different from the first embodiment in that a logical product (AND) gate 422 is arranged instead of the nMOS transistor 421.

The AND gate 422 is to output a logical product of a request (ReqYp1 or the like) from a corresponding row in a pixel array unit 300 and a control signal T_ReqY from a test control circuit 430, to a row AER circuit 260.

Figure 18:
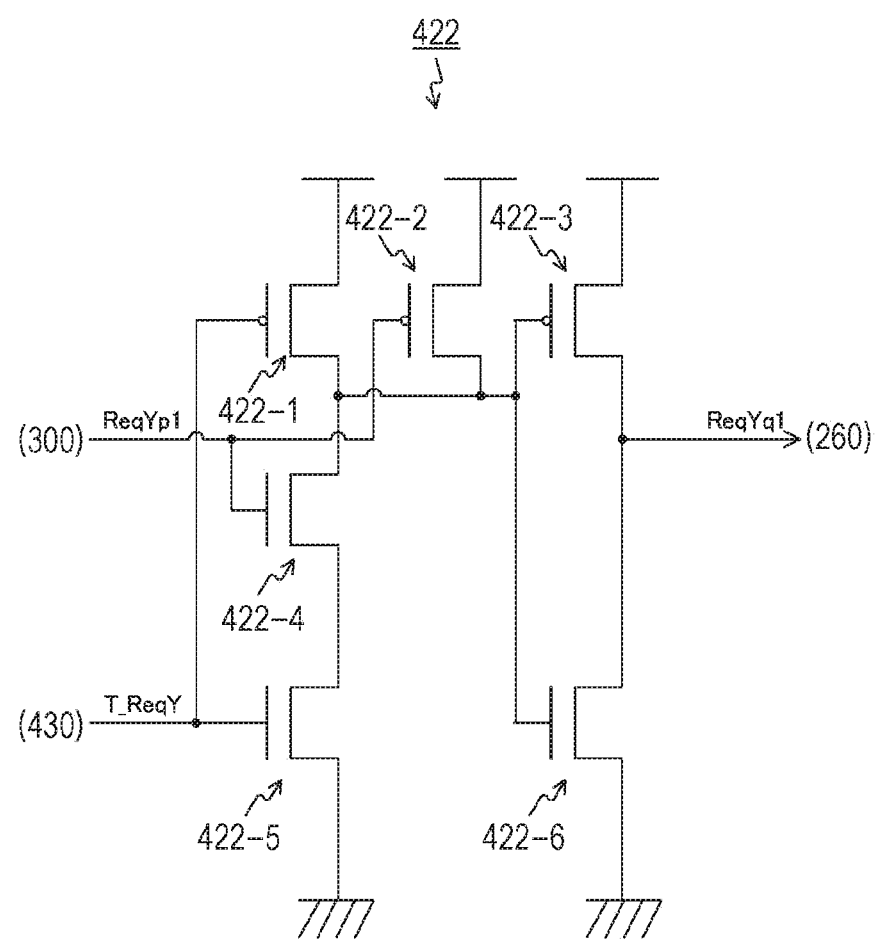
FIG. 18 is a circuit diagram showing a configuration example of a logical product (AND) gate in the first modified example of the first embodiment of the present technology.

FIG. 18 is a circuit diagram showing a configuration example of the AND gate 422 in the first modified example of the first embodiment of the present technology. This AND gate 422 includes pMOS transistors 422-1 to 422-3 and nMOS transistors 422-4 to 422-6. The pMOS transistor 422-1 and the nMOS transistors 422-4 and 422-5 are connected in series between a power supply terminal and a ground terminal. Furthermore, the pMOS transistor 422-3 and the nMOS transistor 422-6 are connected in series between the power supply terminal and the ground terminal. A source of the nMOS transistor 422-2 is connected to a power supply terminal. A drain of the nMOS transistor 422-2 is connected to a connection point between the pMOS transistor 422-1 and the nMOS transistor 422-4, and to gates of the pMOS transistor 422-3 and the nMOS transistor 422-6.

Furthermore, to gates of the nMOS transistor 422-4 and the pMOS transistor 422-2, a request (ReqYp1 or the like) from a corresponding row in the pixel array unit 300 is inputted. To the gates of the pMOS transistor 422-1 and the nMOS transistor 422-5, the control signal T_ReqY from the test control circuit 430 is inputted. From a connection point between the pMOS transistor 422-3 and the nMOS transistor 422-6, a request of the corresponding row (ReqYq1 and the like) is outputted.

FIG. 19 is a view showing an example of an operation of the row test circuit 420 in the first modified example of the first embodiment of the present technology. In a case where the control signal T_ReqY is low level, the row test circuit 420 forcibly outputs the request ReqYq1 of low level regardless of the request ReqYp1.

Whereas, in a case where the control signal T_ReqY is high level, the row test circuit 420 performs through-output on the request ReqYp1 as it is as the request ReqYq1.

As illustrated in FIGS. 18 and 19, during the test, the nMOS transistor 425 is brought into an OFF state by the control signal T_ReqY of low level. Therefore, it is not necessary to charge and discharge the signal line that transmits a request and the ground terminal during the test, and it is possible to suppress an increase in power consumption as compared with the first embodiment.

Figure 20:
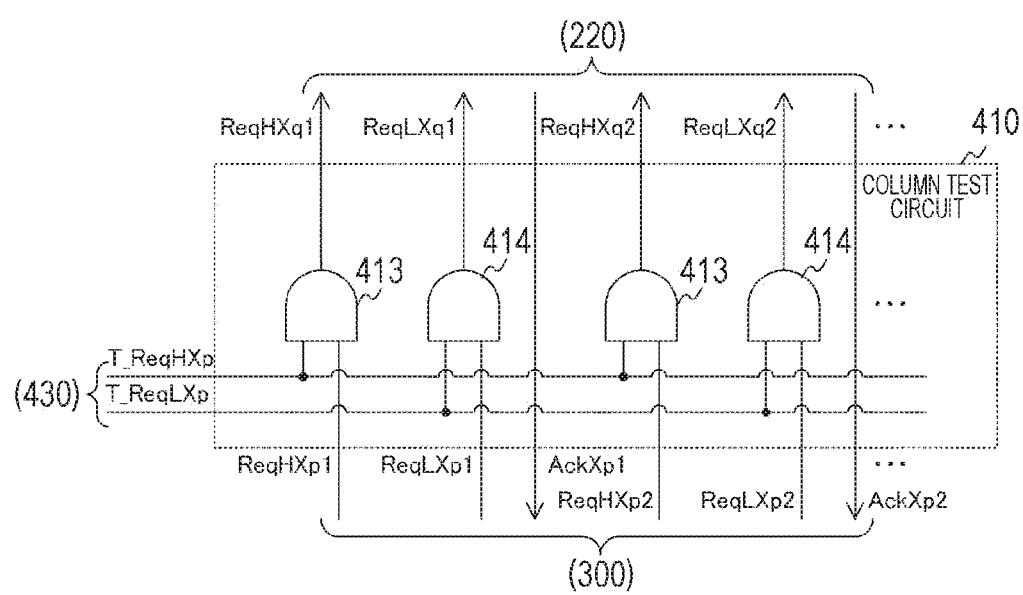
FIG. 20 is a circuit diagram showing a configuration example of a column test circuit in the first modified example of the first embodiment of the present technology.

FIG. 20 is a circuit diagram showing a configuration example of a column test circuit 410 in a first modified example of the first embodiment of the present technology. This column test circuit 410 of the first modified example of the first embodiment is different from that of the first embodiment in that AND gates 413 and 414 are arranged instead of the nMOS transistors 411 and 412. Circuit configurations of these AND gates 413 and 414 are similar to that of the AND gate 422.

Thus, in the first modified example of the first embodiment of the present technology, since the AND gate 422 and the like output a logical product of the request (ReqYp1 and the like) and the control signal T_RegY, it is possible to prevent a short circuit between the signal line that transmits the request and the ground terminal. Therefore, it is possible to suppress an increase in power consumption.

Second Modified Example

In the first embodiment described above, the elements other than the photodiode 322 are arranged on the circuit chip 202, but a circuit scale of the circuit in the circuit chip 202 may increase as the number of pixels increases. A solid-state image sensor 200 of a second modified example of the first embodiment is different from that of the first embodiment in that nMOS transistors 321 and 323 are provided on a light-receiving chip 201.

Figure 21:
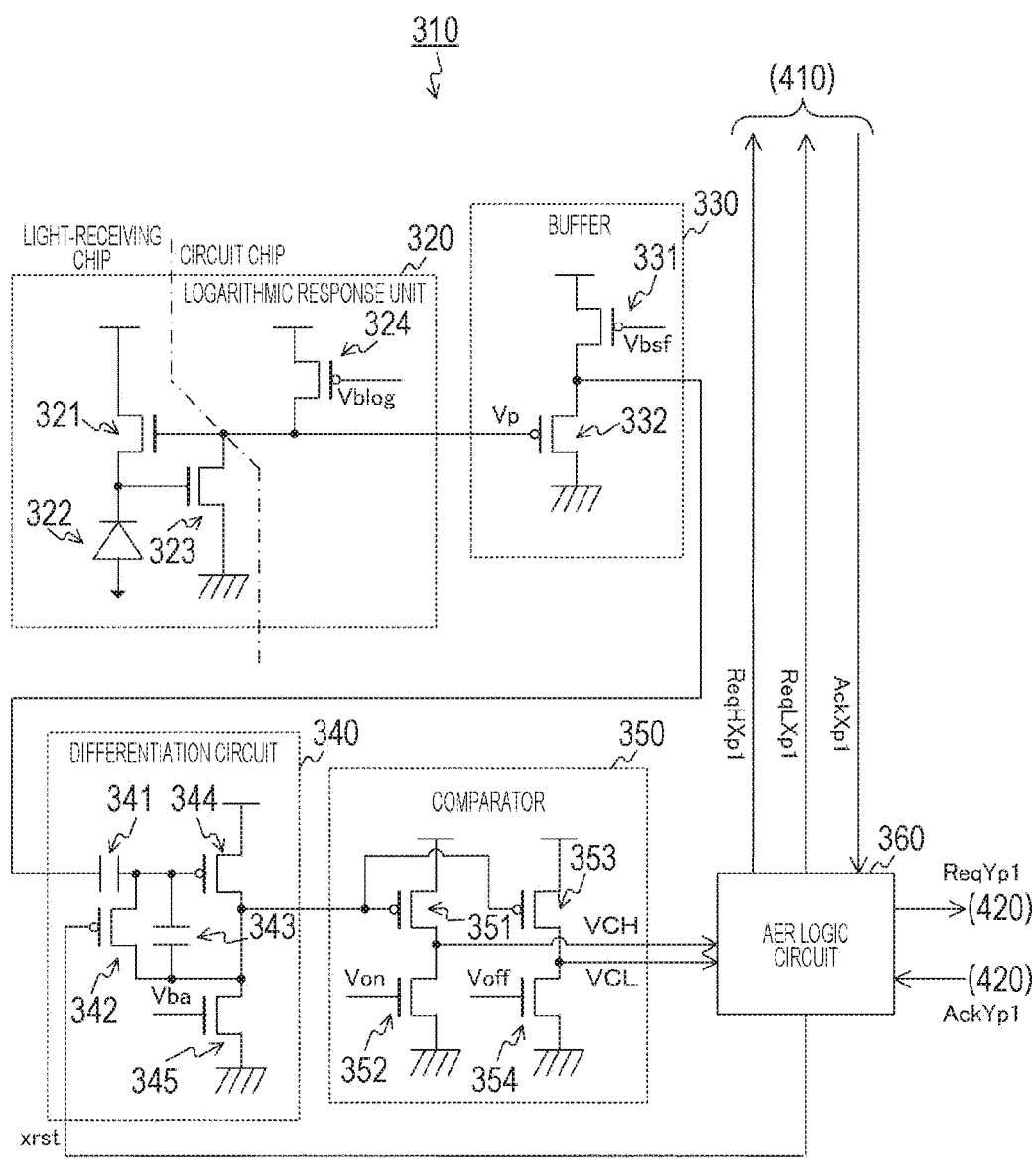
FIG. 21 is a circuit diagram showing a configuration example of a pixel according to a second modified example of the first embodiment of the present technology.

FIG. 21 is a circuit diagram showing a configuration example of a pixel 310 according to the second modified example of the first embodiment of the present technology. This pixel 310 of the second modified example of the first embodiment is different from that of the first embodiment in that, in addition to a photodiode 322, the nMOS transistors 321 and 323 are further arranged on the light-receiving chip 201.

By arranging the nMOS transistors 321 and 323 on the light-receiving chip 201, a circuit scale of a circuit chip 202 can be reduced by an amount of those transistors. Furthermore, by making transistors in the light-receiving chip 201 only N-type, the number of steps for forming transistors can be reduced as compared to a case where N-type transistors and P-type transistors are mixed. Therefore, a manufacturing cost of the light-receiving chip 201 can be reduced.

Figure 22:
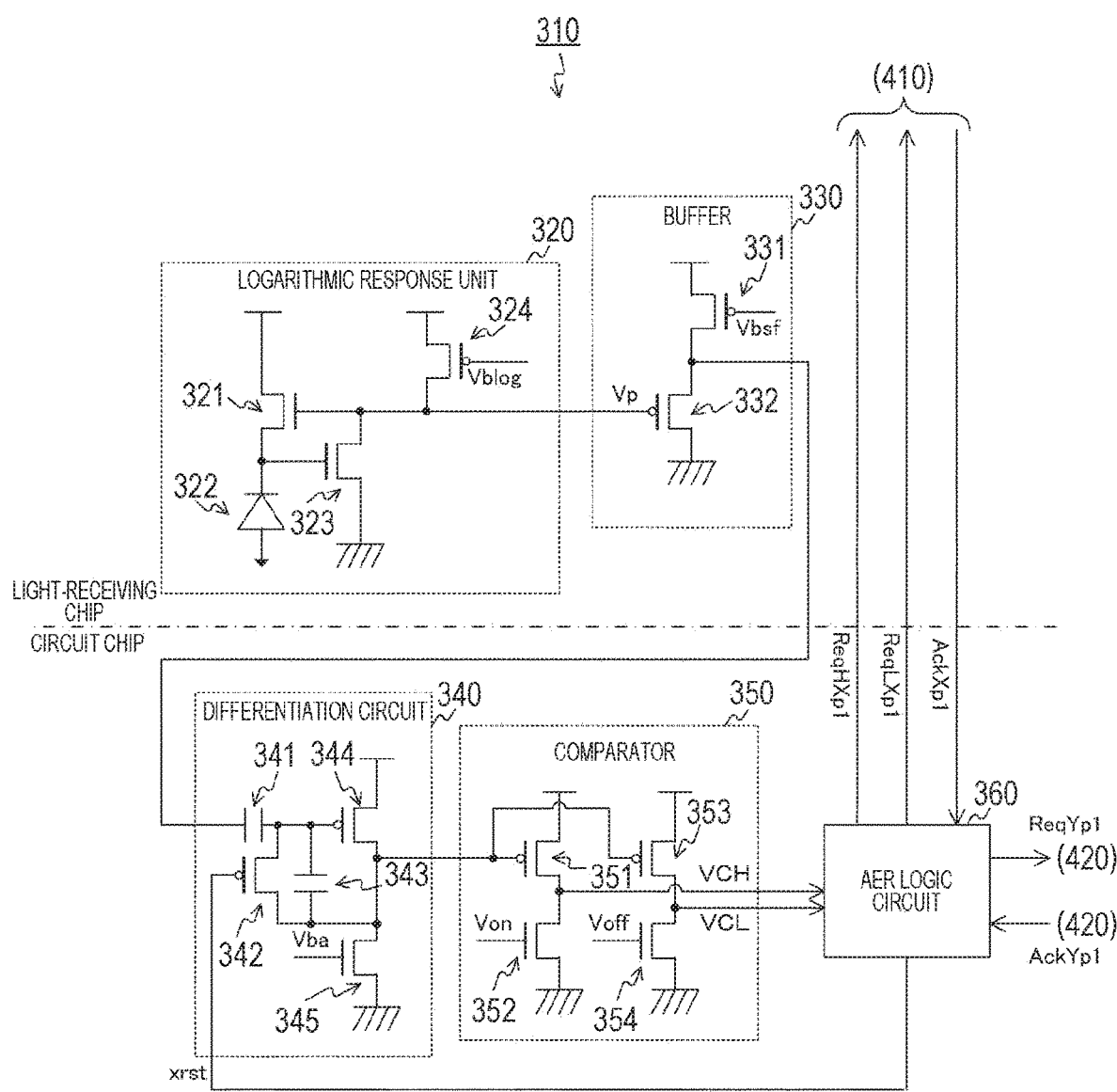
FIG. 22 is a circuit diagram showing a configuration example of a pixel in which up to a buffer is arranged on a light-receiving chip in the second modified example of the first embodiment of the present technology.
Figure 23:
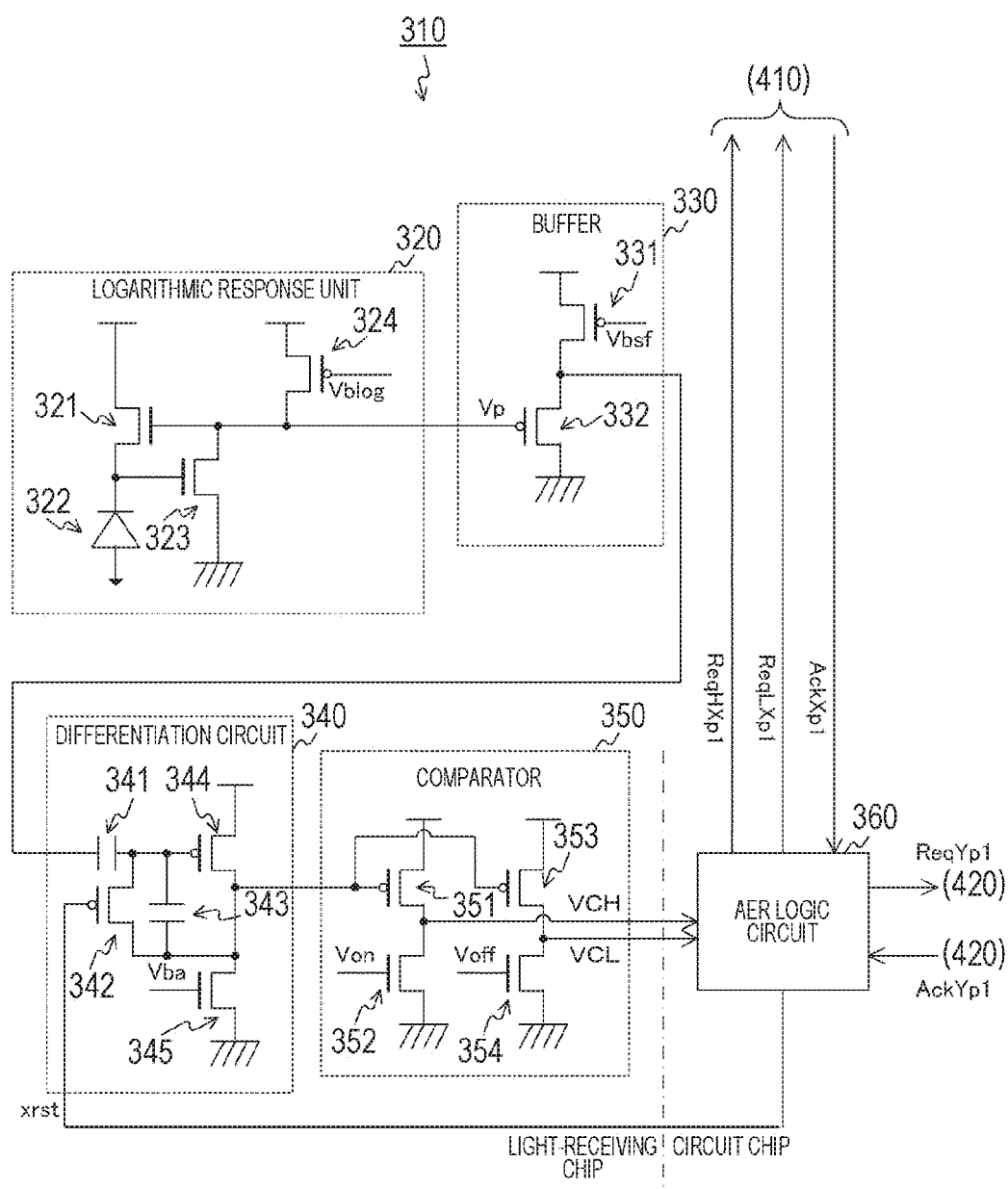
FIG. 23 is a circuit diagram showing a configuration example of a pixel in which up to a comparator is arranged on the light-receiving chip in the second modified example of the first embodiment of the present technology.

Note that a part of a logarithmic response unit 320 is arranged on the light-receiving chip 201 while other than that is arranged on the circuit chip 202, but circuits arranged on the individual chips are not limited to this configuration. For example, as illustrated in FIG. 22, the logarithmic response unit 320 and a buffer 330 can be arranged on the light-receiving chip 201, and other than these can be arranged on the circuit chip 202. Furthermore, as illustrated in FIG. 23, the logarithmic response unit 320, the buffer 330, a differentiation circuit 340, and a comparator 350 can be arranged on the light-receiving chip 201, and other than these can be arranged on the circuit chip 202.

Figure 24:
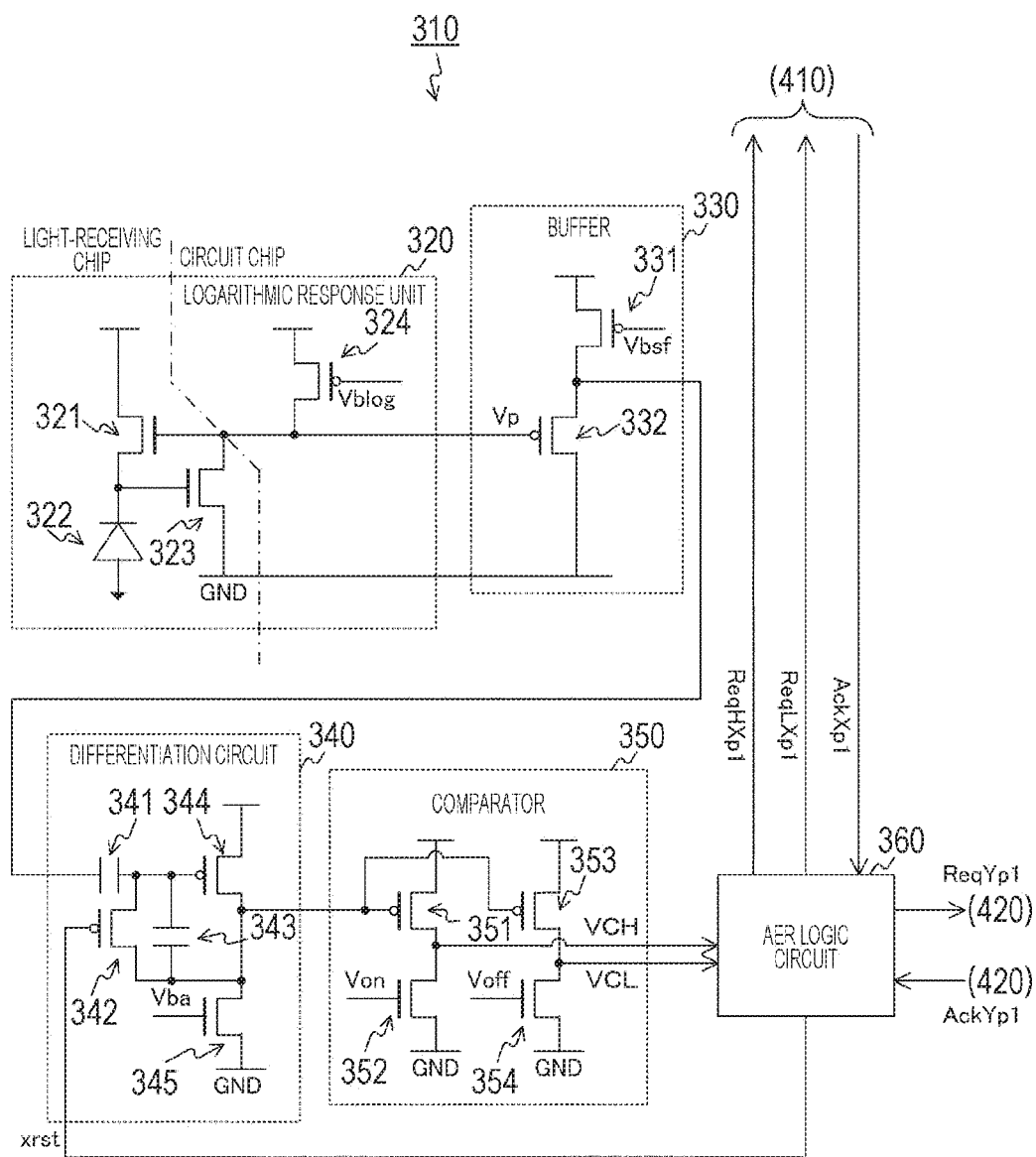
FIG. 24 is a circuit diagram showing a configuration example of a pixel connected with a ground in the second modified example of the first embodiment of the present technology.

Furthermore, in a stacked structure illustrated in FIG. 21, a ground of the light-receiving chip 201 and a ground of the circuit chip 202 can be connected without being separated, as illustrated in FIG. 24. Similarly, in the configurations illustrated in FIGS. 4 and 23, the grounds can be connected.

Thus, according to the second modified example of the first embodiment of the present technology, in addition to the photodiode 322, the nMOS transistors 321 and 323 are also arranged on the light-receiving chip 201, so that the circuit scale of the circuit chip 202 can be reduced.

2. Second Embodiment

In the first embodiment described above, a failure point in the solid-state image sensor 200 is identified by determining which of the pixel and the arbiter has a failure. However, in the first embodiment, the solid-state image sensor 200 has been unable to further identify a failure point regarding which of the plurality of arbiter blocks in the arbiter has a failure. A solid-state image sensor 200 of this second embodiment is different from that of the first embodiment in that a request is outputted to a specific row or column to further identify a failure point.

Figure 25:
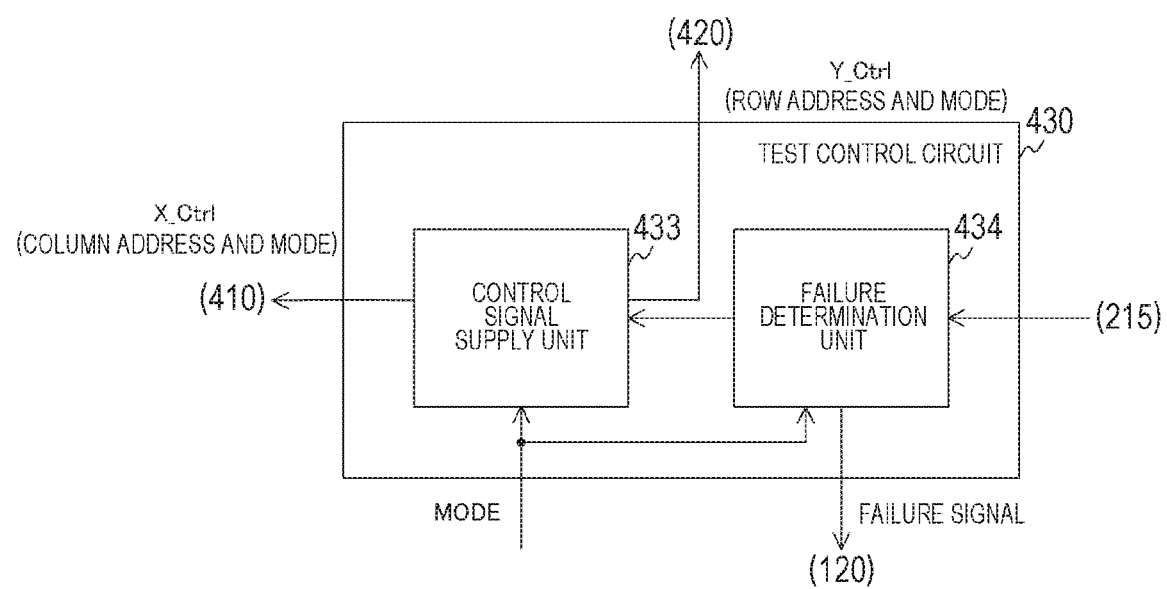
FIG. 25 is a block diagram showing a configuration example of a test control circuit according to a second embodiment of the present technology.

FIG. 25 is a block diagram showing a configuration example of a test control circuit 430 according to the second embodiment of the present technology. This test control circuit 430 of the second embodiment includes a control signal supply unit 433 and a failure determination unit 434.

When a test is instructed, the control signal supply unit 433 controls to forcibly output requests for all rows and all columns with a control signal.

Whereas, when the test is instructed, the failure determination unit 434 sections a pixel array unit 300 into a plurality of areas, and calculates a detection frequency of an address event for every area as a statistic. Furthermore, the failure determination unit 434 calculates an average value of the detection frequencies of individual areas. Then, the failure determination unit 434 extracts an area whose detection frequency is less than the average value as an area corresponding to an arbiter block having a failure, and supplies an address range of the area to the control signal supply unit 433.

The control signal supply unit 433 controls to forcibly output requests for the rows and columns of the area extracted by the failure determination unit 434.

Then, the failure determination unit 434 further sections the extracted area into a plurality of areas, and calculates a detection frequency for every area. Then, the failure determination unit 434 extracts an area whose detection frequency is less than the average value, and supplies an address range of the area to the control signal supply unit 433. After that, the failure determination unit 434 and the control signal supply unit 433 repeat similar control to narrow down an area corresponding to an arbiter block having a failure. Then, when narrowing down to the smallest unit area where failure can be detected (for example, an area of 2 rows×2 columns), the failure determination unit 434 outputs a failure signal indicating an arbiter block corresponding to that area as a failure point, to a DSP circuit 120.

Here, the arbiter can be classified into a fair arbiter and an unfair arbiter. The fair arbiter is a circuit that has signals inputted at the same time as an internal state, and can perform processing preferentially. After the processing is performed preferentially, the priority of a re-inputted signal is lowered, and an input is to be accepted after processing of another high-priority portion is ended. Whereas, the unfair arbiter does not have an internal state of simultaneous input, and thus the response is quick. However, if a request is re-inputted immediately after the end of processing, the unfair arbiter tries to process regardless of the priority. As a result, a circuit that has become respondable at a high speed will preferentially process due to manufacturing variations or the like. Therefore, with the fair arbiter, when requests are outputted for all pixels, detection locations of address events are dispersed without being concentrated in a specific row, column, or pixel. Whereas, with the unfair arbiter, detection points may be concentrated on a specific row or column. Since it is desirable that the detection points are not concentrated when narrowing down a failure point, it is desirable to use the fair arbiter as a column arbiter 213 and a row arbiter 600 of the second embodiment.

Figure 26:
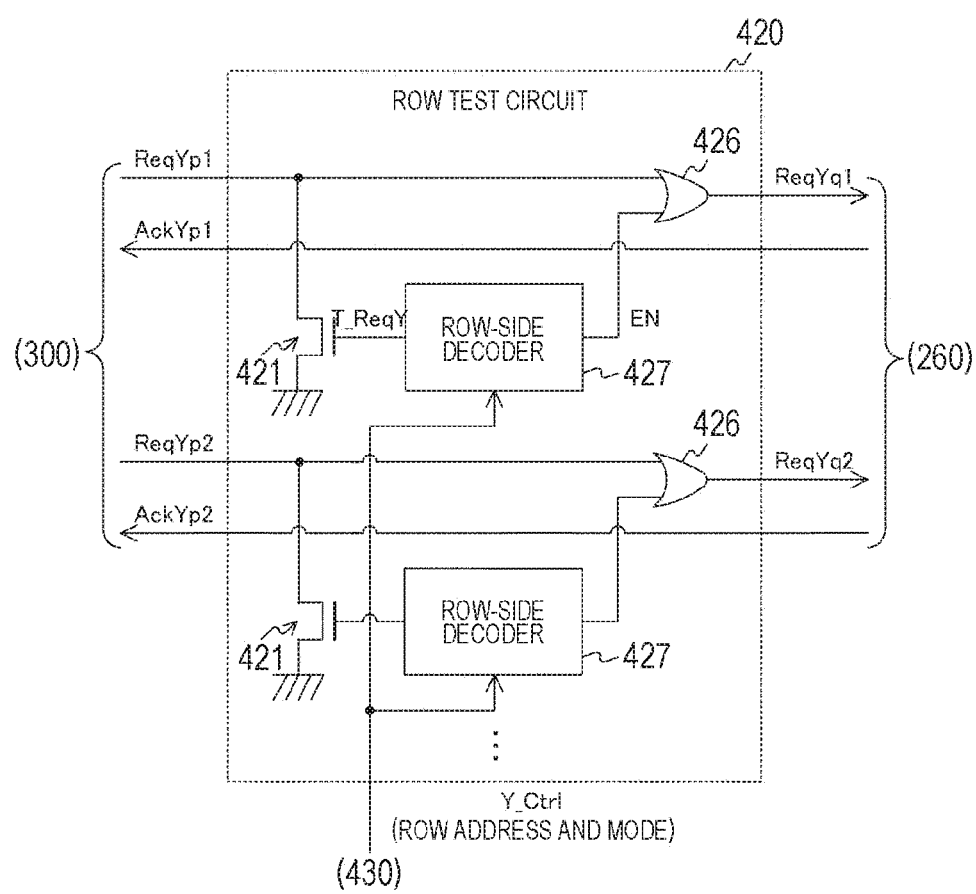
FIG. 26 is a circuit diagram showing a configuration example of a row test circuit according to the second embodiment of the present technology.

FIG. 26 is a circuit diagram showing a configuration example of a row test circuit 420 according to the second embodiment of the present technology. This row test circuit 420 of the second embodiment is different from that of the first embodiment in that a logical sum (OR) gate 426 and a row-side decoder 427 are further included. These OR gate 426 and row-side decoder 427 are provided for every row. Furthermore, to the row-side decoders 427 of all rows, a control signal Y_Ctrl from the test control circuit 430 is inputted. This control signal Y_Ctrl is obtained by encoding a row address for which a request is outputted and a mode signal MODE.

The row-side decoder 427 is to decode the control signal Y_Ctrl. This row-side decoder 427 generates control signals T_ReqY and EN on the basis of the decoded row address and the mode signal MODE, and the control signal T_ReqY is supplied to a gate of a nMOS transistor 421, and the control signal EN is supplied to the OR gate 426.

The OR gate 426 is to output a logical sum of the control signal EN and a request (ReqYp1 or the like) of a corresponding row, to a row AER circuit 260.

FIG. 27 is a view showing an example of an operation of the row-side decoder 427 according to the second embodiment of the present technology. In a case where the mode signal MODE has a value indicating a normal mode (for example, a logical value "0"), the row-side decoder 427 outputs the control signals T_ReqY and EN of low level.

Whereas, in a case where the mode signal MODE has a value indicating a test mode (for example, a logical value "1"), the row-side decoder 427 determines whether or not the decoded row address matches a row address corresponding to itself.

In a case of matching, the row-side decoder 427 outputs the control signal T_ReqY of high level and the control signal EN of low level. Therefore, a low level request is forcibly outputted from that row. Furthermore, in a case of mismatching, the row-side decoder 427 outputs the control signal T_ReqY of low level and the control signal EN of high level. Therefore, high level is forcibly outputted from that row, and the request is blocked.

In this way, with the control signal Y_Ctrl, the test control circuit 430 can control to output only a request for a specific row address and can block requests for the rest of row addresses. This similarly applies to a column address.

Figure 28:
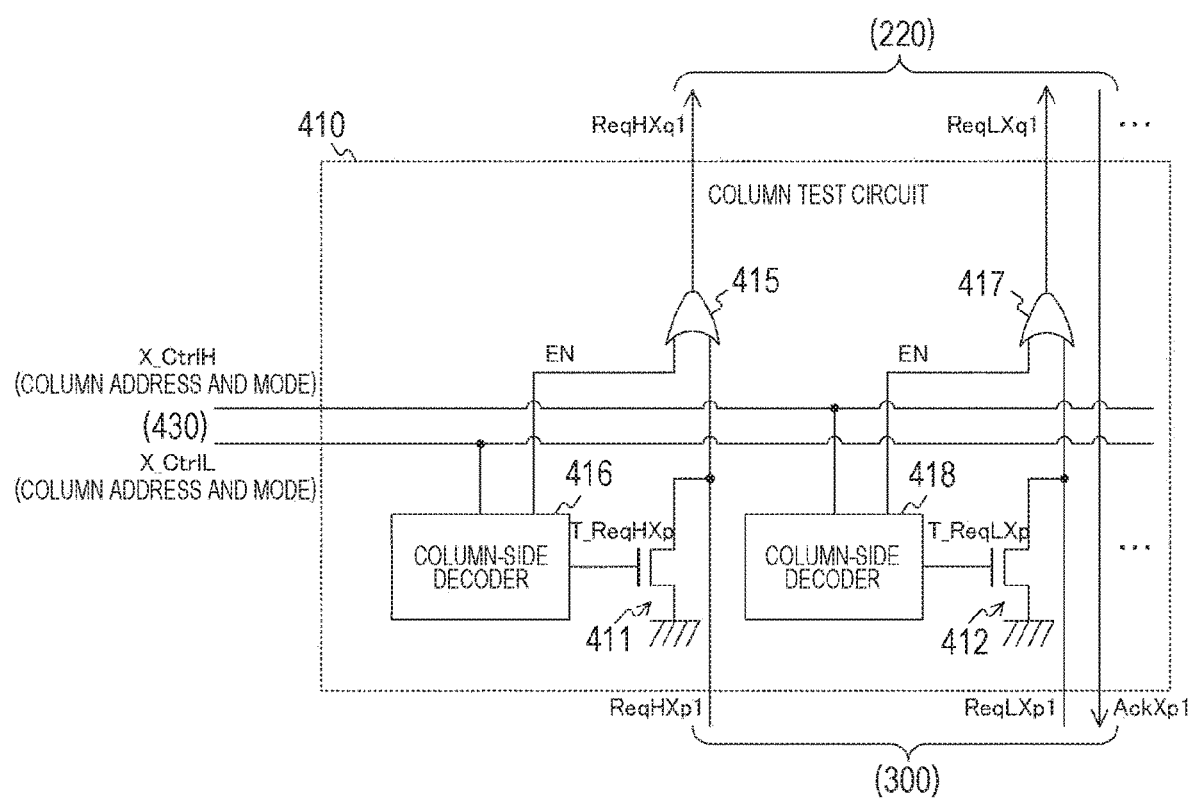
FIG. 28 is a circuit diagram showing a configuration example of a column test circuit according to the second embodiment of the present technology.

FIG. 28 is a circuit diagram showing a configuration example of a column test circuit 410 according to the second embodiment of the present technology. This column test circuit 410 of the second embodiment is different from that of the first embodiment in that OR gates 415 and 417 and column-side decoders 416 and 418 are further provided for every column.

Configurations of the column-side decoders 416 and 418 are similar to that of the row-side decoder 427. However, the column-side decoder 416 decodes a control signal X_Ctrl1L, and the column-side decoder 418 decodes a control signal X_Ctrl1H. These control signals are obtained by encoding a column address and the mode signal MODE. In a case where a detection signal of an ON event is to be outputted, the test control circuit 430 controls to output a request from a specific column address with the control signal X_Ctrl1H, and to block requests for all column addresses with the control signal X_Ctrl1L. Whereas, in a case where a detection signal of an OFF event is to be outputted, the test control circuit 430 controls to output a request from a specific column address with the control signal X_Ctrl1L, and to block requests for all column addresses with the control signal X_Ctrl1H.

Configuration of the OR gates 415 and 417 are similar to that of the OR gate 426.

Figure 29A:
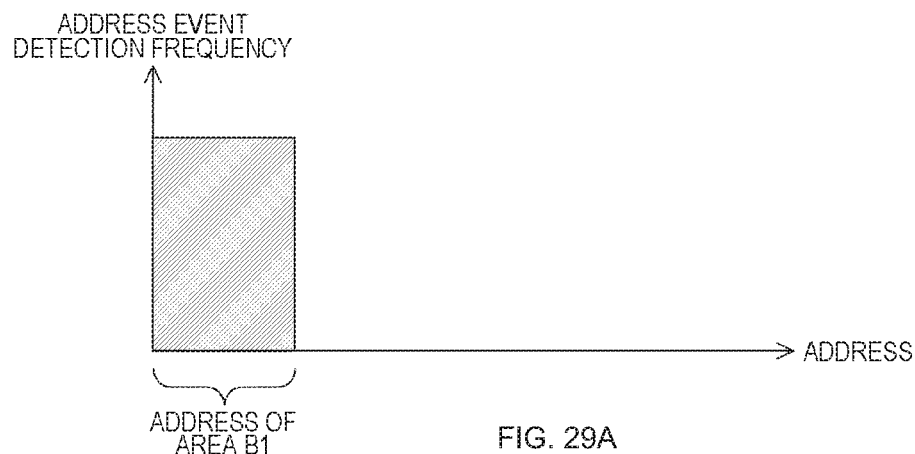
FIGS. 29A, 29B, and 29C are views for explaining a test method in the second embodiment of the present technology.
Figure 29B:
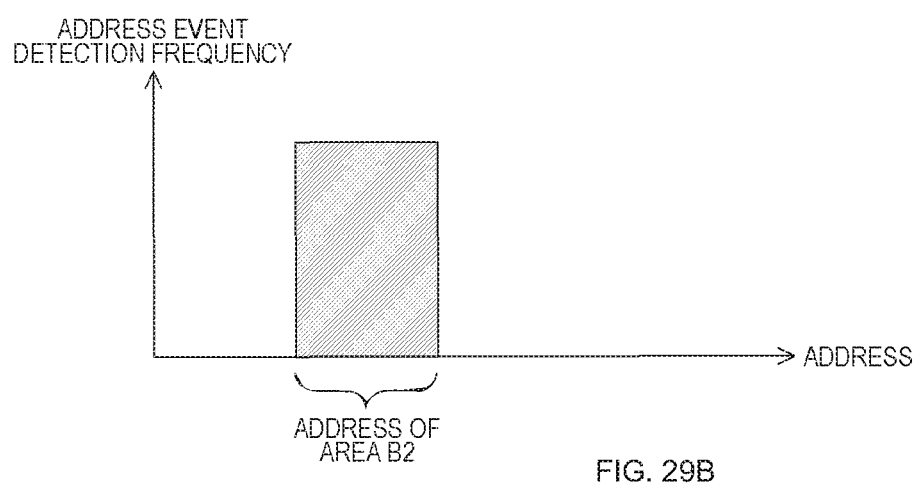
Figure 29C:
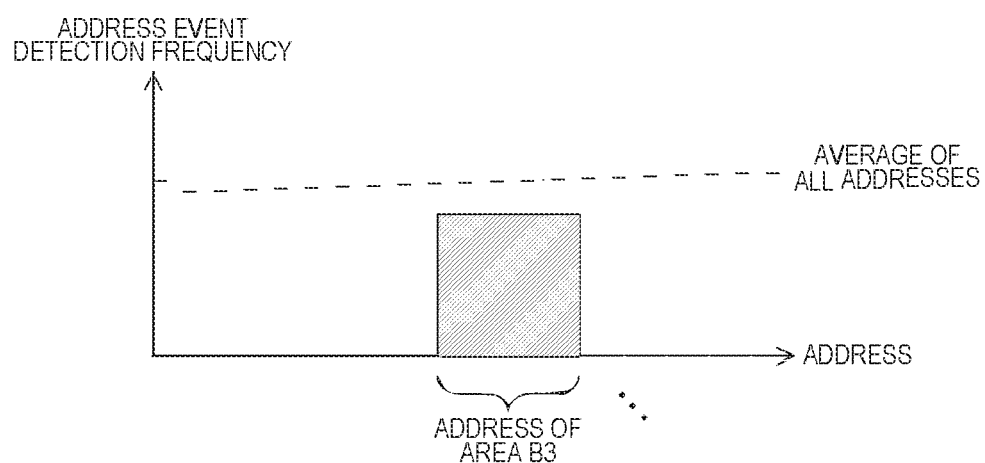

FIGS. 29A, 29B, and 29C are views for explaining a test method in the second embodiment of the present technology. A vertical axis in the figure shows a detection frequency of an address event, and a horizontal axis shows an address. FIG. 29A shows an example of a detection result of an area B1, and FIG. 29B shows an example of a detection result of an area B2 adjacent to the area B1. FIG. 29C shows an example of a detection result of an area B3 adjacent to the area B2.

When a test is instructed, the failure determination unit 434 calculates a detection frequency of the area B1 as illustrated in FIG. 29A. Furthermore, the failure determination unit 434 calculates detection frequencies of the areas B2 and B3 as illustrated in FIGS. 29B and 29C. Similarly, a detection frequency is calculated for every area other than the areas B1 to B3.

Here, it is assumed that the detection frequency of the area B3 is lower than an average value of all addresses. In this case, the failure determination unit 434 extracts that area as an area corresponding to an arbiter block having a failure. The control signal supply unit 433 controls to forcibly output requests for rows and columns of the extracted area B3, and to block requests for the rest of the areas.

Figure 30A:
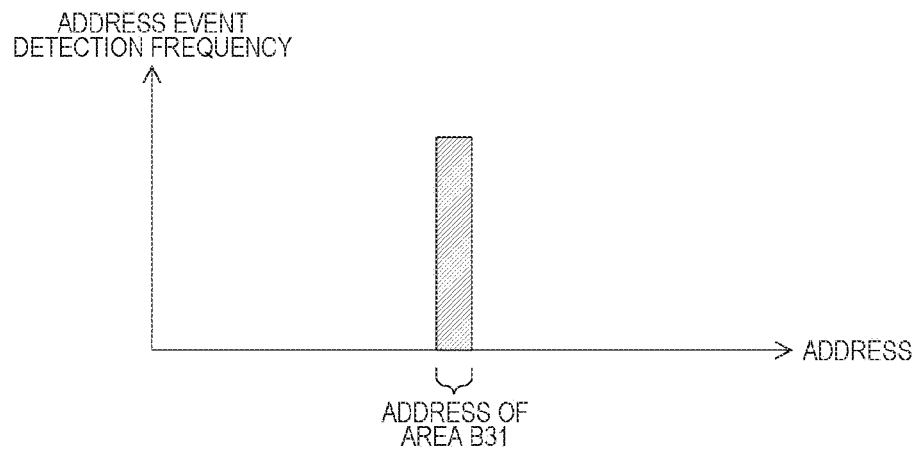
FIGS. 30A, 30B, and 30C are views for explaining a method of further sectioning an area to narrow down a failure point in the second embodiment of the present technology.
Figure 30B:
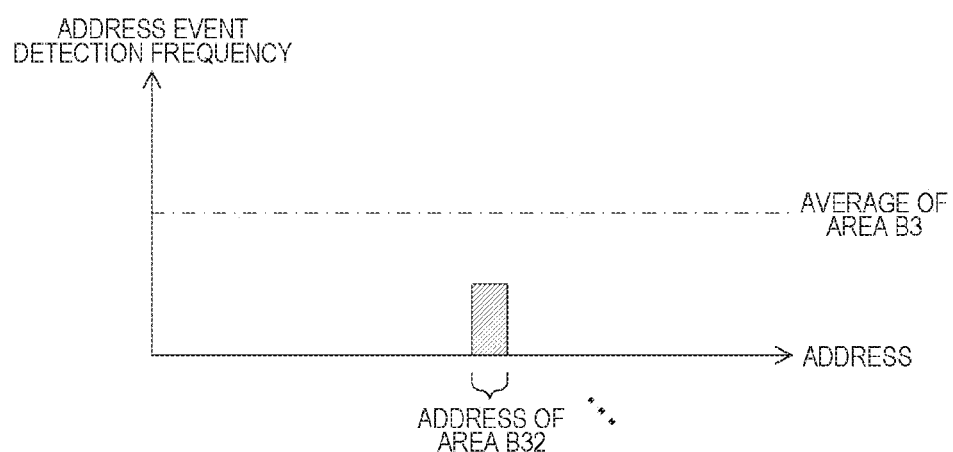
Figure 30C:
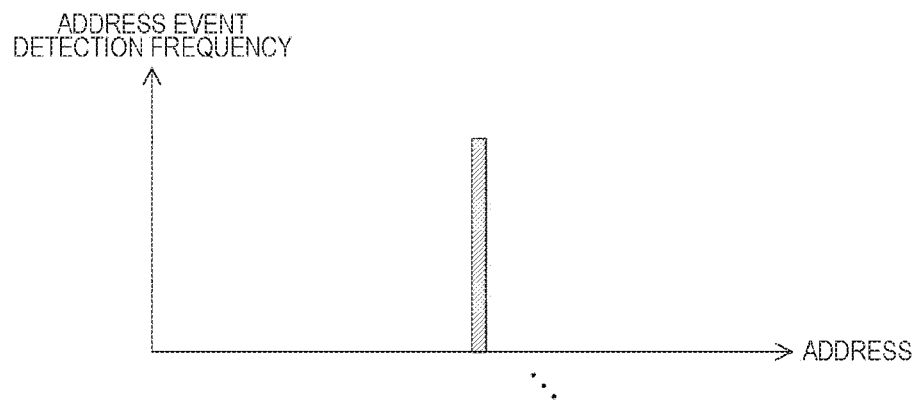

FIGS. 30A, 30B, and 30C are views for explaining a method of further sectioning an area to narrow down a failure point in the second embodiment of the present technology. FIG. 30A shows an example of a detection result of an area B31 among areas obtained by sectioning the area B3. FIG. 30B shows an example of a detection result of an area B32 adjacent to the area B31 among the areas obtained by sectioning the area B3. FIG. 30C shows an example of a detection result of any of areas obtained by sectioning the area B32.

The failure determination unit 434 calculates a detection frequency of each of the areas B31 and B32 among the plurality of areas obtained by further sectioning the extracted area B3, as illustrated in FIGS. 30A and 30B.

Here, it is assumed that the detection frequency of the area B32 is lower than an average value. In this case, the failure determination unit 434 extracts that area as an area corresponding to an arbiter block having a failure. The control signal supply unit 433 controls to forcibly output requests for rows and columns of the extracted area B32, and to block requests for the rest of rows and columns.

The failure determination unit 434 calculates a detection frequency of any of the plurality of areas obtained by further sectioning the extracted area B32, as illustrated in FIG. 30C. The solid-state image sensor 200 repeats the processing illustrated in FIGS. 29A, 29B, 29C, 30A, 30B, and 30C to subsection the area and narrow down the failure point.

Figure 31:
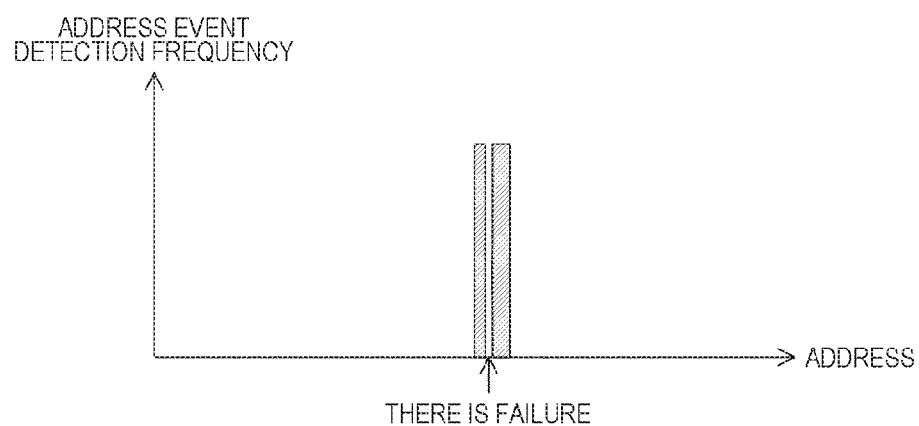

FIG. 31 is a view showing an example of detection of a failure point in the second embodiment of the present technology. The detection frequency becomes extremely low in a part of an area obtained by subsectioning the area B32. The failure determination unit 434 determines that a block arbiter corresponding to that area has a failure.

Thus, according to the second embodiment of the present technology, since the test control circuit 430 controls to output a request corresponding to some of all addresses, it is possible to identify a failure point in the arbiter by narrowing down the address for which the request is outputted.

3. Application Example to Mobile Object

The technology (the present technology) according to the present disclosure can be applied to various products. For example, the technology according to the present disclosure may be realized as a device equipped on any type of mobile objects, such as an automobile, an electric car, a hybrid electric car, a motorcycle, a bicycle, personal mobility, an airplane, a drone, a ship, a robot, and the like.

Figure 32:
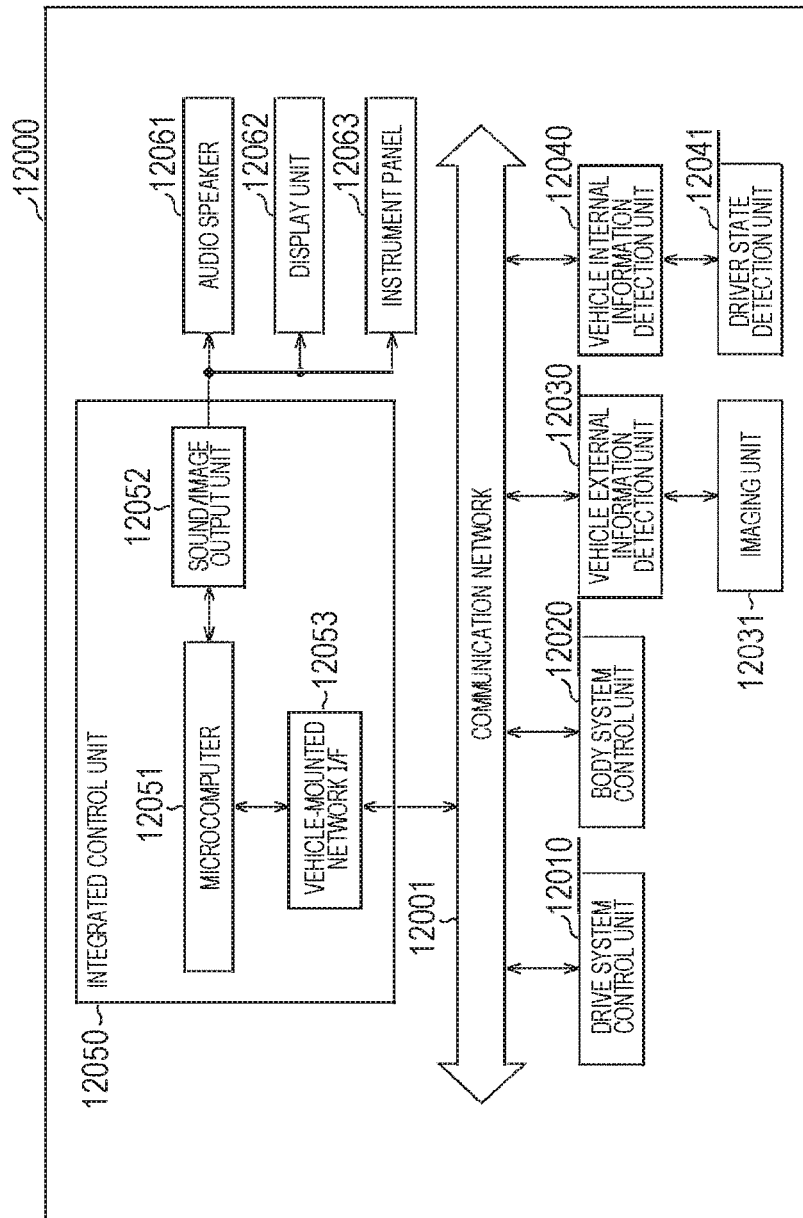

FIG. 32 is a block diagram showing a schematic configuration example of a vehicle control system, which is an example of a mobile object control system to which the technology according to the present disclosure may be applied.

A vehicle control system 12000 includes a plurality of electronic control units connected via a communication network 12001. In the example shown in FIG. 32, the vehicle control system 12000 includes a drive system control unit 12010, a body system control unit 12020, a vehicle external information detection unit 12030, a vehicle internal information detection unit 12040, and an integrated control unit 12050. Furthermore, as a functional configuration of the integrated control unit 12050, a microcomputer 12051, a sound/image output unit 12052, and a vehicle-mounted network interface (I/F) 12053 are illustrated.

The drive system control unit 12010 controls an operation of devices related to a drive system of a vehicle in accordance with various programs. For example, the drive system control unit 12010 functions as: a driving force generation device for generation of a driving force of the vehicle such as an internal combustion engine or a drive motor; a driving force transmission mechanism for transmission of a driving force to wheels; a steering mechanism to adjust a steering angle of the vehicle; and a control device such as a braking device that generates a braking force of the vehicle.

The body system control unit 12020 controls an operation of various devices mounted on a vehicle body in accordance with various programs. For example, the body system control unit 12020 functions as a control device for a keyless entry system, a smart key system, a power window device, or various lamps such as a headlamp, a back lamp, a brake lamp, a turn indicator, or a fog lamp. In this case, the body system control unit 12020 may be inputted with radio waves or signals of various switches transmitted from a portable device that substitutes for a key. The body system control unit 12020 receives an input of these radio waves or signals, and controls a door lock device, a power window device, a lamp, and the like of the vehicle.

The vehicle external information detection unit 12030 detects information about the outside of the vehicle equipped with the vehicle control system 12000. For example, to the vehicle external information detection unit 12030, an imaging unit 12031 is connected. The vehicle external information detection unit 12030 causes the imaging unit 12031 to capture an image of an outside of the vehicle, and receives the captured image. The vehicle external information detection unit 12030 may perform an object detection process or a distance detection process for a person, a vehicle, an obstacle, a sign, a character on a road surface, or the like on the basis of the received image.

The imaging unit 12031 is an optical sensor that receives light and outputs an electric signal according to an amount of received light. The imaging unit 12031 can output the electric signal as an image, or can output as distance measurement information. Furthermore, the light received by the imaging unit 12031 may be visible light or non-visible light such as infrared light.

The vehicle internal information detection unit 12040 detects information inside the vehicle. The vehicle internal information detection unit 12040 is connected with, for example, a driver state detection unit 12041 that detects a state of a driver. The driver state detection unit 12041 may include, for example, a camera that images the driver, and, on the basis of detection information inputted from the driver state detection unit 12041, the vehicle internal information detection unit 12040 may calculate a degree of tiredness or a degree of concentration of the driver, or may determine whether or not the driver is asleep.

On the basis of information inside and outside the vehicle acquired by the vehicle external information detection unit 12030 or the vehicle internal information detection unit 12040, the microcomputer 12051 can operate a control target value of the driving force generation device, the steering mechanism or the braking device, and output a control command to the drive system control unit 12010. For example, the microcomputer 12051 can perform cooperative control for the purpose of realizing functions of advanced driver assistance system (ADAS) including avoidance of collisions or mitigation of impacts of the vehicle, follow-up traveling on the basis of a distance between vehicles, vehicle speed maintenance traveling, vehicle collision warning, vehicle lane departure warning, and the like.

Furthermore, by controlling the driving force generation device, the steering mechanism, the braking device, or the like on the basis of the information about surroundings of the vehicle acquired by the vehicle external information detection unit 12030 or vehicle internal information detection unit 12040, the microcomputer 12051 may perform cooperative control for the purpose of, for example, automatic driving for autonomously traveling without depending on an operation of the driver.

Furthermore, the microcomputer 12051 can output a control command to the body system control unit 12020 on the basis of information about the outside of the vehicle acquired by the vehicle external information detection unit 12030. For example, the microcomputer 12051 can control a headlamp in accordance with a position of a preceding vehicle or an oncoming vehicle detected by the vehicle external information detection unit 12030, and perform cooperative control for the purpose of antiglare, such as switching a high beam to a low beam.

The sound/image output unit 12052 transmits an output signal of at least one of sound or an image, to an output device capable of visually or audibly notifying, of information, a passenger of the vehicle or outside the vehicle. In the example of FIG. 32, an audio speaker 12061, a display unit 12062, and an instrument panel 12063 are illustrated as the output devices. The display unit 12062 may include, for example, at least one of an on-board display or a head-up display.

Figure 33:
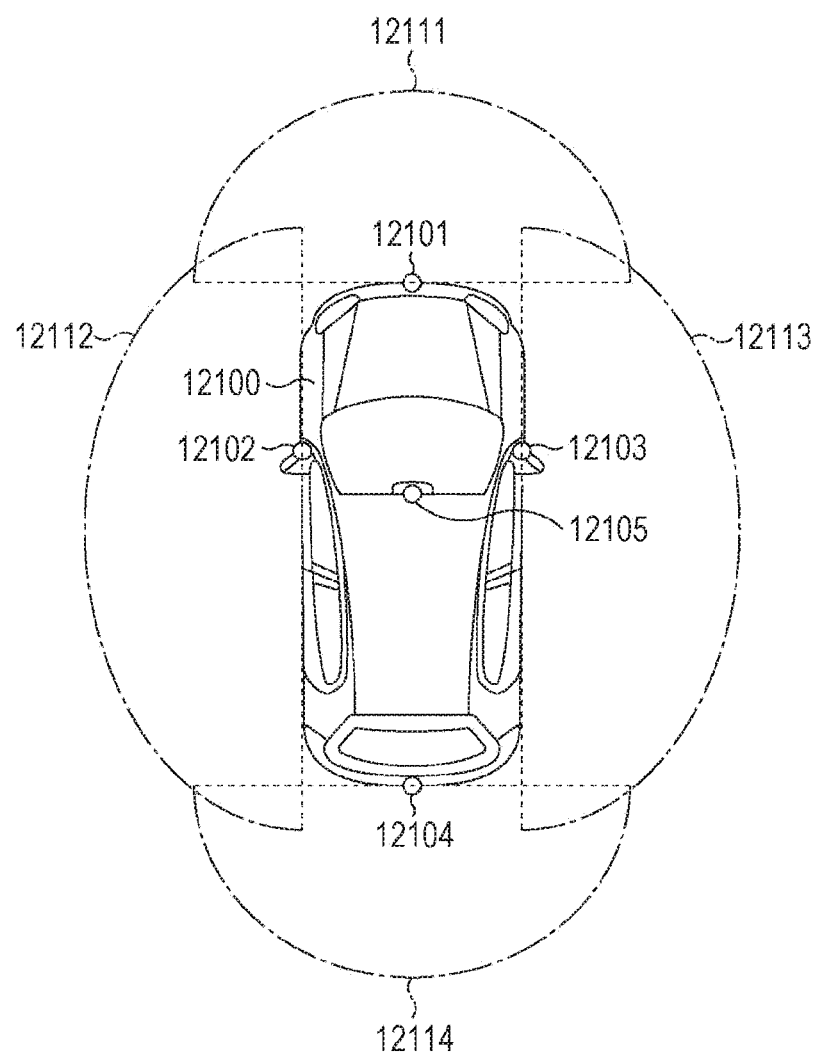

FIG. 33 is a view showing an example of an installation position of the imaging unit 12031.

In FIG. 33, as the imaging unit 12031, imaging units 12101, 12102, 12103, 12104, and 12105 are provided.

The imaging units 12101, 12102, 12103, 12104, and 12105 are provided at, for example, a front nose, side mirrors, a rear bumper, a back door, an upper part of a windshield in a vehicle cabin, or the like of a vehicle 12100. The imaging unit 12101 provided at the front nose and the imaging unit 12105 provided at the upper part of the windshield in the vehicle cabin mainly acquire an image in front of the vehicle 12100. The imaging units 12102 and 12103 provided at the side mirrors mainly acquire an image of a side of the vehicle 12100. The imaging unit 12104 provided at the rear bumper or the back door mainly acquires an image behind the vehicle 12100. The imaging unit 12105 provided at the upper part of the windshield in the vehicle cabin is mainly used for detection of a preceding vehicle, or a pedestrian, an obstacle, a traffic light, a traffic sign, a lane, or the like.

Note that FIG. 33 shows an example of an imaging range of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 each provided at the side mirrors, and an imaging range 12114 indicates an imaging range of the imaging unit 12104 provided at the rear bumper or the back door. For example, by superimposing image data captured by the imaging units 12101 to 12104, an overhead view image of the vehicle 12100 viewed from above can be obtained.

At least one of the imaging units 12101 to 12104 may have a function of acquiring distance information. For example, at least one of the imaging units 12101 to 12104 may be a stereo camera including a plurality of image sensors, or an image sensor having pixels for detecting a phase difference.

For example, on the basis of the distance information obtained from the imaging units 12101 to 12104, by obtaining a distance to each solid object within the imaging ranges 12111 to 12114 and a time change of this distance (a relative speed with respect to the vehicle 12100), the microcomputer 12051 can extract, as a preceding vehicle, especially a solid object that is the closest on a travel route of the vehicle 12100, and that is traveling at a predetermined speed (for example, 0 km/h or more) in substantially the same direction as the vehicle 12100. Moreover, the microcomputer 12051 can set an inter-vehicle distance to be secured from a preceding vehicle in advance, and perform automatic brake control (including follow-up stop control), automatic acceleration control (including follow-up start control), and the like. In this way, it is possible to perform cooperative control for the purpose of, for example, automatic driving for autonomously traveling without depending on an operation of the driver.

For example, on the basis of the distance information obtained from the imaging units 12101 to 12104, the microcomputer 12051 can classify solid object data regarding solid objects into a two-wheeled vehicle, an ordinary vehicle, a large vehicle, a pedestrian, a utility pole, and the like, to extract and use for automatic avoidance of obstacles. For example, the microcomputer 12051 distinguishes obstacles around the vehicle 12100 into obstacles that are visible to the driver of the vehicle 12100 and obstacles that are difficult to see. Then, the microcomputer 12051 can determine a collision risk indicating a risk of collision with each obstacle, and provide driving assistance for collision avoidance by outputting an alarm to the driver via the audio speaker 12061 or the display unit 12062, or by performing forced deceleration and avoidance steering via the drive system control unit 12010, when the collision risk is equal to or larger than a set value and there is a possibility of collision.

At least one of the imaging units 12101 to 12104 may be an infrared camera that detects infrared light. For example, the microcomputer 12051 can recognize a pedestrian by determining whether or not a pedestrian exists in a captured image of the imaging units 12101 to 12104. Such recognition of a pedestrian is performed by, for example, a procedure of extracting a feature point in a captured image of the imaging unit 12101 to 12104 as an infrared camera, and a procedure of performing pattern matching processing on a series of feature points indicating a contour of an object and determining whether or not the object is a pedestrian. When the microcomputer 12051 determines that a pedestrian is present in the image captured by the imaging units 12101 to 12104 and recognizes the pedestrian, the sound/image output unit 12052 controls the display unit 12062 so as to superimpose and display a rectangular contour line for emphasis on the recognized pedestrian. Furthermore, the sound/image output unit 12052 may control the display unit 12062 to display an icon or the like indicating a pedestrian at a desired position.

An example of the vehicle control system to which the technology according to the present disclosure can be applied has been described above. The technology according to the present disclosure can be applied to the imaging unit 12031 among the configurations described above. Specifically, for example, the imaging apparatus 100 in FIG. 1 can be applied to the imaging unit 12031. By applying the technology according to the present disclosure to the imaging unit 12031, a failure point can be identified, and thus the safety and reliability of the system can be improved.

Note that the embodiments described above are examples for embodying the present technology, and the matters in the embodiments and the matters used to specify the invention in the claims have a corresponding relationship. Similarly, the matters used to specify the invention in the claims and the matters in the embodiments of the present technology to which the same names are assigned have a corresponding relationship. However, the present technology is not limited to the embodiments, and can be embodied by applying various modifications to the embodiments without departing from the gist thereof.

Note that the effects described in this specification are merely examples and are not limited, and additional effects may be present.

Note that the present technology can also have the following configurations.

(1) A solid-state image sensor including:
a plurality of pixels configured to generate a request for requesting transmission of a detection signal that is predetermined, in a case where a predetermined event is detected;
a test circuit configured to output the request of each of the plurality of pixels as an output request in a case where a test is not instructed, and generate a plurality of new requests and output each as the output request in a case where the test is instructed;
an arbiter configured to arbitrate the output request;
a communication circuit configured to transmit the detection signal on the basis of an arbitration result of the arbiter; and a failure determination unit configured to determine whether or not the arbiter has a failure on the basis of the detection signal in a case where the test is instructed.

(2) The solid-state image sensor according to (1), in which the test circuit includes a transistor configured to supply a predetermined potential to a signal line connected to the arbiter in a case where the test is instructed, and the request is outputted via the signal line.

(3) The solid-state image sensor according to (1), in which the test circuit includes a logical product gate configured to output, as the output request, a logical product of the request and a control signal instructing the test.

(4) The solid-state image sensor according to any one of (1) to (3) above, in which
the plurality of pixels is individually assigned with addresses that are mutually different, and
the test circuit controls to output, among the new requests, one corresponding to some of the addresses, as the output request.

(5) The solid-state image sensor according to (4), in which
a pixel array unit in which the plurality of pixels is arranged is sectioned into regions of a predetermined number,
the arbiter includes an arbiter block for every piece of the regions, and
the failure determination unit identifies, among the arbiter blocks, an arbiter block having a failure on the basis of the detection signal.

(6) The solid-state image sensor according to any one of (1) to (5) above, in which
a part of each of the pixels is arranged on a light-receiving chip,
a rest of each of the pixels is located on a circuit chip, and
the light-receiving chip is stacked on the circuit chip.

(7) An imaging apparatus including:
a plurality of pixels configured to generate a request for requesting transmission of a detection signal that is predetermined, in a case where a predetermined event is detected;
a test circuit configured to output the request of each of the plurality of pixels as an output request in a case where a test is not instructed, and generate a plurality of new requests and output each as the output request in a case where the test is instructed;
an arbiter configured to arbitrate the output request;
a communication circuit configured to transmit the detection signal on the basis of an arbitration result of the arbiter;
a failure determination unit configured to determine whether or not the arbiter has a failure on the basis of the detection signal in a case where the test is instructed; and
a signal processing unit configured to execute a predetermined process on the detection signal.

(8) A method for controlling a solid-state image sensor, the method including:
a request generation procedure of generating a request for requesting transmission of a detection signal that is predetermined, in a case where a predetermined event is detected by a plurality of pixels;
a test procedure of outputting the request of each of the plurality of pixels as an output request in a case where a test is not instructed, and generating a plurality of new requests and outputting each as the output request in a case where the test is instructed;
an arbitration procedure of arbitrating the output request;
a communication procedure of transmitting the detection signal on the basis of an arbitration result of the arbiter; and
a failure determination procedure of determining whether or not the arbiter has a failure on the basis of the detection signal in a case where the test is instructed.

REFERENCE SIGNS LIST

100 Imaging apparatus
110 Optical unit
120 DSP circuit
130 Display unit
140 Operation unit
150 Bus
160 Frame memory
170 Storage unit
180 Power supply unit
200 Solid-state image sensor
201 Light-receiving chip
202 Circuit chip
213 Column arbiter
214 Column address encoder
215 State machine
216 Row address encoder
220 Column AER circuit
221 Column AER block
222 H-side column AER block
223 L-side column AER block
224, 415, 417, 426 Logical sum (OR) gate
260 Row AER circuit
270 Row AER block
271, 324, 331, 332, 342, 344, 351, 353, 364, 369, 422-1, 422-2, 422-3 pMOS transistor
272, 273, 321, 323, 345, 352, 354, 361 to 363, 365 to 368, 370, 371, 411, 412, 421, 422-4, 422-5, 422-6 nMOS transistor
274, 275, 601, 602 Inverter
276 Negative logical sum (NOR) gate
300 Pixel array unit 310 Pixel
320 Logarithmic response unit
322 Photodiode
330 Buffer
340 Differentiation circuit
341, 343, 372 Capacitor
350 Comparator
360 AER logic circuit
410 Column test circuit
413, 414, 422 Logical product (AND) gate
416, 418 Column-side decoder
420 Row test circuit
427 Row-side decoder
430 Test control circuit
431, 433 Control signal supply unit
432, 434 Failure determination unit
600 Row arbiter
610, 650 to 654 Arbiter block
12031 Imaging unit

The invention claimed is:

1. A solid-state image sensor, comprising:
a plurality of pixels configured to generate a request for transmission of a detection signal that is predetermined, in a case where a predetermined event is detected;
a test circuit configured to output the request of each of the plurality of pixels as an output request in a case where a test is not instructed, and generate a plurality of new requests and output each of the plurality of new requests as the output request in a case where the test is instructed;
an arbiter configured to arbitrate the output request;
a communication circuit configured to transmit the detection signal based on an arbitration result of the arbiter; and
a failure determination unit configured to determine whether the arbiter has a failure based on the detection signal in the case where the test is instructed.

2. The solid-state image sensor according to claim 1, wherein
the test circuit includes a transistor configured to supply a predetermined potential to a signal line connected to the arbiter in the case where the test is instructed, and the output request is outputted via the signal line.

3. The solid-state image sensor according to claim 1, wherein
the test circuit includes a logical product gate configured to output, as the output request, a logical product of the output request and a control signal instructing the test.

4. The solid-state image sensor according to claim 1, wherein
the plurality of pixels is individually assigned with a plurality of addresses that are mutually different, and the test circuit controls output, among the plurality of new requests, of one new request corresponding to at least one of the plurality of addresses, as the output request.

5. The solid-state image sensor according to claim 4, wherein
a pixel array unit in which the plurality of pixels is arranged is sectioned into a plurality of regions of a predetermined number,
the arbiter includes an arbiter block for every piece of the plurality of regions, and
the failure determination unit identifies, among a plurality of arbiter blocks, the arbiter block that has the failure based on the detection signal.

6. The solid-state image sensor according to claim 1, wherein
a part of each of the plurality of pixels is arranged on a light-receiving chip,
a rest of each of the plurality of pixels is located on a circuit chip, and
the light-receiving chip is stacked on the circuit chip.

7. An imaging apparatus, comprising:
a plurality of pixels configured to generate a request for transmission of a detection signal that is predetermined, in a case where a predetermined event is detected;
a test circuit configured to output the request of each of the plurality of pixels as an output request in a case where a test is not instructed, and generate a plurality of new requests and output each of the plurality of new requests as the output request in a case where the test is instructed;
an arbiter configured to arbitrate the output request;
a communication circuit configured to transmit the detection signal based on an arbitration result of the arbiter;
a failure determination unit configured to determine whether the arbiter has a failure based on the detection signal in the case where the test is instructed; and
a signal processing unit configured to execute a predetermined process on the detection signal.

8. A method for controlling a solid-state image sensor, the method comprising:
generating a request for transmission of a detection signal that is predetermined, in a case where a predetermined event is detected by a plurality of pixels;
outputting the request of each of the plurality of pixels as an output request in a case where a test is not instructed, and generating a plurality of new requests and outputting each of the plurality of new requests as the output request in a case where the test is instructed;
arbitrating the output request;
transmitting the detection signal based on an arbitration result of the arbiter; and
determining whether the arbiter has a failure based on the detection signal in the case where the test is instructed.

* * * * *